United States Patent
Zhang et al.

(10) Patent No.: US 12,335,217 B2
(45) Date of Patent: Jun. 17, 2025

(54) NOTIFICATION PROCESSING SYSTEM, METHOD, AND ELECTRONIC DEVICE

(71) Applicant: Huawei Technologies Co., Ltd., Shenzhen (CN)

(72) Inventors: Lirong Zhang, Shenzhen (CN); Maochang Dang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/904,559

(22) PCT Filed: Feb. 4, 2021

(86) PCT No.: PCT/CN2021/075143
§ 371 (c)(1),
(2) Date: Aug. 18, 2022

(87) PCT Pub. No.: WO2021/164554
PCT Pub. Date: Aug. 26, 2021

(65) Prior Publication Data
US 2023/0094272 A1    Mar. 30, 2023

(30) Foreign Application Priority Data
Feb. 19, 2020  (CN) .......................... 202010102903.6

(51) Int. Cl.
*H04L 51/224* (2022.01)
*H04L 51/18* (2022.01)

(52) U.S. Cl.
CPC ............ *H04L 51/224* (2022.05); *H04L 51/18* (2013.01)

(58) Field of Classification Search
CPC ............................. H04L 51/224; H04L 51/18
See application file for complete search history.

(56) References Cited

U.S. PATENT DOCUMENTS

| | | | |
|---|---|---|---|
| 9,116,596 B2 | 8/2015 | Roman et al. | |
| 10,469,283 B1 | 11/2019 | Kinney et al. | |

(Continued)

FOREIGN PATENT DOCUMENTS

| | | |
|---|---|---|
| CN | 102916866 A | 2/2013 |
| CN | 103037319 A | 4/2013 |

(Continued)

OTHER PUBLICATIONS

Dong, T., "Advanced Practice of Android Development", Published May 2020, Press Machinery Industry Press, with English abstract, 4 pages.

(Continued)

*Primary Examiner* — Ryan J Jakovac
(74) *Attorney, Agent, or Firm* — Slater Matsil, LLP

(57) ABSTRACT

When a mobile phone is used as a first device to generate a notification, the mobile phone determines whether there is another device in an ambient environment that can be configured to prompt the mobile phone to generate the notification, and determines whether there is another device in the ambient environment that is more suitable for executing a task corresponding to the notification. If yes, the mobile phone sends a prompt message to a second device, and after the prompt device receives the prompt message, the second mobile phone generates the notification. In addition, the mobile phone selects a third device that is more suitable for executing the task corresponding to the notification, and reminds a user by using the prompt device.

21 Claims, 24 Drawing Sheets

(56) References Cited

U.S. PATENT DOCUMENTS

| | | | |
|---|---|---|---|
| 11,558,913 B2* | 1/2023 | Nguyen | H04B 7/2656 |
| 2006/0168388 A1 | 7/2006 | Von Tetzchner | |
| 2007/0168471 A1 | 7/2007 | Childress et al. | |
| 2009/0074224 A1 | 3/2009 | Wright | |
| 2011/0128825 A1 | 6/2011 | Tanaka | |
| 2012/0069199 A1 | 3/2012 | Chang et al. | |
| 2013/0145287 A1 | 6/2013 | Jung et al. | |
| 2013/0150019 A1 | 6/2013 | Lee | |
| 2014/0006496 A1 | 1/2014 | Dearman et al. | |
| 2014/0087654 A1 | 3/2014 | Kiveisha et al. | |
| 2014/0228063 A1 | 8/2014 | Harris et al. | |
| 2015/0032889 A1 | 1/2015 | Chan et al. | |
| 2015/0065091 A1 | 3/2015 | Lee et al. | |
| 2015/0244770 A1 | 8/2015 | Yang | |
| 2015/0365453 A1 | 12/2015 | Cheng | |
| 2016/0026352 A1 | 1/2016 | Brown et al. | |
| 2017/0093833 A1* | 3/2017 | Sugaya | H04L 67/131 |
| 2017/0220311 A1* | 8/2017 | Oh | H04L 65/1083 |
| 2017/0244655 A1 | 8/2017 | Moon et al. | |
| 2017/0302609 A1* | 10/2017 | Vardhan | H04L 51/214 |
| 2017/0344253 A1 | 11/2017 | Zhang | |
| 2018/0063313 A1 | 3/2018 | Lee et al. | |
| 2018/0083899 A1* | 3/2018 | Sumter | G06F 3/167 |
| 2018/0183881 A1* | 6/2018 | Lewis | H04L 67/148 |
| 2018/0373398 A1 | 12/2018 | Seixeiro et al. | |
| 2018/0374146 A1 | 12/2018 | Rawal | |
| 2019/0149863 A1* | 5/2019 | Lewis | H04L 41/16 706/12 |
| 2019/0158725 A1 | 5/2019 | Shintani et al. | |
| 2019/0188222 A1 | 6/2019 | Li et al. | |
| 2019/0313367 A1 | 10/2019 | Ryu et al. | |
| 2019/0364005 A1 | 11/2019 | Sun | |
| 2020/0288283 A1 | 9/2020 | Li et al. | |
| 2021/0185162 A1 | 6/2021 | Takahashi et al. | |

FOREIGN PATENT DOCUMENTS

| | | |
|---|---|---|
| CN | 103108007 A | 5/2013 |
| CN | 103179156 A | 6/2013 |
| CN | 103257813 A | 8/2013 |
| CN | 102523346 B | 12/2013 |
| CN | 103634389 A | 3/2014 |
| CN | 103873657 A | 6/2014 |
| CN | 103888907 A | 6/2014 |
| CN | 103916984 A | 7/2014 |
| CN | 104092749 A | 10/2014 |
| CN | 104094183 A | 10/2014 |
| CN | 104301777 A | 1/2015 |
| CN | 104661080 A | 5/2015 |
| CN | 104822128 A | 8/2015 |
| CN | 104866523 A | 8/2015 |
| CN | 105025164 A | 11/2015 |
| CN | 105049329 A | 11/2015 |
| CN | 105225457 A | 1/2016 |
| CN | 105518578 A | 4/2016 |
| CN | 105592193 A | 5/2016 |
| CN | 105812563 A | 7/2016 |
| CN | 105892977 A | 8/2016 |
| CN | 105975571 A | 9/2016 |
| CN | 106203186 A | 12/2016 |
| CN | 106210262 A | 12/2016 |
| CN | 106294798 A | 1/2017 |
| CN | 106332310 A | 1/2017 |
| CN | 106464571 A | 2/2017 |
| CN | 106488306 A | 3/2017 |
| CN | 106528617 A | 3/2017 |
| CN | 106604244 A | 4/2017 |
| CN | 107025059 A | 8/2017 |
| CN | 107769881 A | 3/2018 |
| CN | 103491119 B | 5/2018 |
| CN | 108616663 A | 10/2018 |
| CN | 108702602 A | 10/2018 |
| CN | 108924364 A | 11/2018 |
| CN | 109088815 A | 12/2018 |
| CN | 109156041 A | 1/2019 |
| CN | 109275032 A | 1/2019 |
| CN | 109660842 A | 4/2019 |
| CN | 109862266 A | 6/2019 |
| CN | 110046013 A | 7/2019 |
| CN | 105578227 B | 8/2019 |
| CN | 110175082 A | 8/2019 |
| CN | 110199503 A | 9/2019 |
| CN | 110224920 A | 9/2019 |
| CN | 110377250 A | 10/2019 |
| CN | 110389736 A | 10/2019 |
| CN | 111010479 A | 4/2020 |
| CN | 111240547 A | 6/2020 |
| CN | 111404802 A | 7/2020 |
| CN | 112134788 A | 12/2020 |
| JP | 2002359670 A | 12/2002 |
| JP | 2009087063 A | 4/2009 |
| JP | 2010108448 A | 5/2010 |
| JP | 2014053692 A | 3/2014 |
| JP | 2015076816 A | 4/2015 |
| JP | 2016513398 A | 5/2016 |
| KR | 20170013190 A | 2/2017 |
| KR | 20170099330 A | 8/2017 |
| TW | 201033818 A | 9/2010 |
| TW | M502853 U | 6/2015 |
| WO | 2010050567 A1 | 5/2010 |
| WO | 2012157328 A1 | 11/2012 |
| WO | 2014088231 A1 | 6/2014 |
| WO | 2014200730 A1 | 12/2014 |
| WO | 2015063000 A1 | 5/2015 |
| WO | 2015196656 A1 | 12/2015 |
| WO | 2017097088 A1 | 6/2017 |
| WO | 2017163496 A1 | 9/2017 |
| WO | 2018104834 A1 | 6/2018 |
| WO | 2019186566 A1 | 10/2019 |
| WO | 2019213882 A1 | 11/2019 |
| WO | 2019222946 A1 | 11/2019 |
| WO | 2020042119 A1 | 3/2020 |
| WO | 2021164445 A1 | 8/2021 |

OTHER PUBLICATIONS

Ma, W. et al, "Associated Information Pushing System Based on Content image recognition", Shenzhen Cool Open Network Technology Co., Ltd., May 2018, with English Abstract, 7 pages.

Bluetooth (Reg. No. 2911905; U.S. Appl. No. 76/054,633; Dec. 21, 2004) (Year: 2004).

Wi-Fi (Reg. No. 4415824; U.S. Appl. No. 85/684,971; Oct. 8, 2013) (Year: 2013).

Diana Roe, The Windows 10 system tray—How to show or hide icons!, Digitial Citizen, pp. 1-20 (2019) (Year: 2019).

* cited by examiner

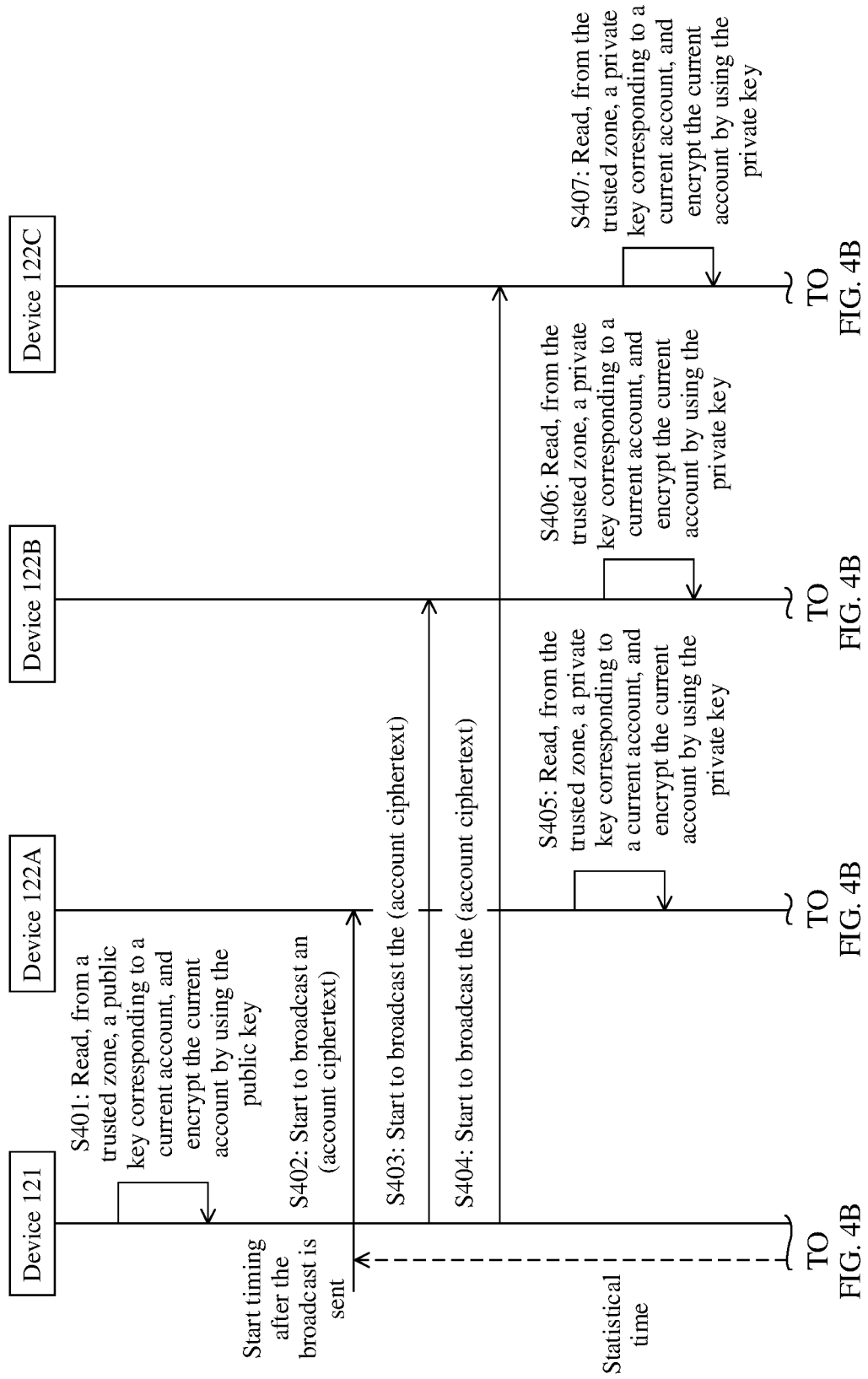

NOTIFICATION PROCESSING SYSTEM, METHOD, AND ELECTRONIC DEVICE

CROSS-REFERENCE TO RELATED APPLICATIONS

This application is a national stage of International Application No. PCT/CN2021/075143, filed on Feb. 4, 2021, which claims priority to Chinese Patent Application No. 202010102903.6, filed on Feb. 19, 2020. Both of the aforementioned applications are hereby incorporated by reference in their entireties.

TECHNICAL FIELD

This application relates to the wireless communications field, and in particular, to a notification processing system, a method, and an electronic device.

BACKGROUND

With development of intelligent terminal technologies, a user or a home usually has a plurality of intelligent terminal devices, such as a smart TV, a smart speaker, a mobile phone, a tablet computer, and a notebook computer. However, these devices usually work independently, and cannot cooperate with each other. In a scenario, when the intelligent terminal device is not around the user, the user often misses an important notification received by the intelligent terminal device. For example, the user watches TV in a living room, and when the mobile phone placed in a bedroom receives a new notification, the user may not hear a prompt tone of the mobile phone, and therefore the user cannot know that there is an unread notification. Consequently, the user cannot read the unread notification in time, and may miss some important notifications.

SUMMARY

This application provides a notification processing system, a method, and an electronic device, to enhance a capability of cooperation between devices. In this way, a plurality of devices can cooperate with each other to process a task corresponding to a notification, and a capability of information processing between the plurality of devices can be enhanced. In addition, a user can obtain the notification in time and perform subsequent operations conveniently.

To achieve the foregoing objectives, the following embodiments are used in this application.

According to a first aspect, an embodiment of this application provides a notification processing system. The system includes a first device and a second device. The first device is configured to: generate a notification, and send a first message, where the first message is used to prompt the first device to generate the notification. The second device is configured to: receive the first message, and generate a prompt for executing a task corresponding to the notification in a third device; and send a second message in response to receiving user's input corresponding to the prompt, to request the third device to execute the task corresponding to the notification.

When the first device generates the notification, the second device prompts that the first device receives the notification, and prompts that the third device can execute the task. When detecting user's input corresponding to the prompt, the second device sends the second message to the third device, to execute the task in the third device. The first device and the second device have a capability of cooperative notification, thereby improving efficiency of notification processing between a plurality of devices.

With reference to the first aspect, in a possible implementation, the system further includes the third device, and the third device is configured to execute the task corresponding to the notification. The first device, the second device, and the third device in the system may cooperate with each other, thereby processing the task corresponding to the notification processing between a plurality of devices.

According to a second aspect, an embodiment of this application provides an electronic device. The electronic device includes a processor, a memory, a display, and a communications module. The processor, the communications module, the display, and the memory are coupled, the memory is configured to store computer program code, the computer program code includes computer instructions, and when the computer instructions are executed by the electronic device, the electronic device is enabled to perform the following operations: receiving a first message sent by a first device, where the first message is used to prompt the first device to generate a notification; generating a prompt for executing a task corresponding to the notification in a third device; and sending a second message in response to receiving user's input corresponding to the prompt, to request the third device to execute the task corresponding to the notification.

According to a third aspect, an embodiment of this application provides a notification prompt method. The method includes: The second device receives a first message sent by a first device, where the first message is used to prompt the first device to generate a notification. The second device generates a prompt for executing a task corresponding to the notification in a third device. The second device sends a second message in response to receiving user's input corresponding to the prompt, to request the third device to execute the task corresponding to the notification.

According to a fourth aspect, an embodiment of this application provides an electronic device. The electronic device includes a processor, a memory, a display, a communications module, and a notification decision manager. The processor, the mobile communications module, the display, and the memory are coupled, the memory is configured to store computer program code, the computer program code includes computer instructions, and when the computer instructions are executed by the electronic device, the electronic device is enabled to perform the following operations: generating a notification; detecting a device within a communication range that can be configured to prompt the notification, and detecting a device within the communication range that can be configured to execute a task corresponding to the notification; detecting that the second device can be configured to prompt the notification, and that a third device can be configured to execute the task corresponding to the notification; and sending the first message to the second device, where the first message includes notification information and information about the third device, the notification information is used to prompt the first device to generate the notification, and the information about the third device is used to generate the prompt in the second device.

According to a fifth aspect, an embodiment of this application provides a notification prompt method. The method includes: A first device generates a notification. The first device detects a device within a communication range that can be configured to prompt the notification, detects a device within the communication range that can be configured to execute a task corresponding to the notification, and detects that the second device can be configured to prompt the notification, and that a third device can be configured to execute the task corresponding to the notification. The first device sends the first message to the second device, where the first message includes notification information and information about the third device, the notification information is used to prompt the first device to generate the notification, and the information about the third device is used to generate the prompt in the second device.

According to a sixth aspect, an embodiment of this application provides a computer-readable storage medium. The computer-readable storage medium includes program instructions, and when the program instructions are run on a terminal device, the terminal device is enabled to perform the method in the third aspect.

According to a seventh aspect, an embodiment of this application provides a computer-readable storage medium. The computer-readable storage medium includes program instructions, and when the program instructions are run on a terminal device, the terminal device is enabled to perform the method in the fifth aspect.

For beneficial effects that can be achieved by the electronic device, the notification prompt method, and the readable storage medium, refer to the beneficial effects in the corresponding notification processing system provided above. Details are not described herein again.

BRIEF DESCRIPTION OF THE DRAWINGS

FIG. 4A and FIG. 4B are a flowchart of a system networking process according to an embodiment of this application;

DETAILED DESCRIPTION OF ILLUSTRATIVE EMBODIMENTS

Figure 1:
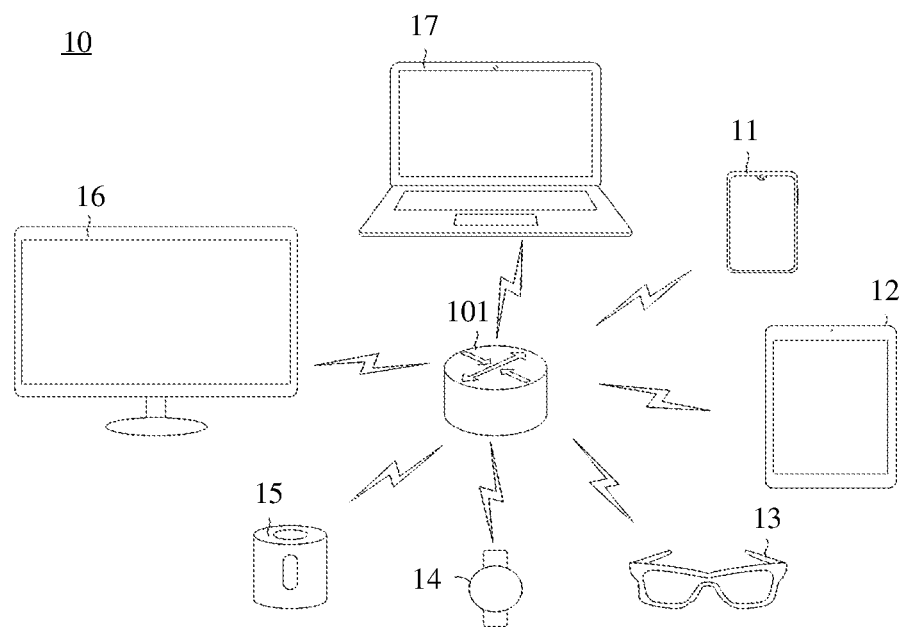
FIG. 1 is a schematic diagram of a system according to an embodiment of this application.

The following describes the embodiments in the embodiments of this application with reference to the accompanying drawings in the embodiments of this application. In the embodiments of this application, the term "example" or "for example" is used to represent giving an example, an illustration, or a description. Any embodiment or design scheme described as an "example" or "for example" in the embodiments of this application should not be explained as being more preferred or having more advantageous than another embodiment or design scheme. Exactly, use of the term such as "example" or "for example" is intended to present a related concept in a specific manner. In descriptions of the embodiments of this application, "/" means "or" unless otherwise specified. For example, A/B may represent A or B. In this specification, "and/or" describes only an association relationship of associated objects and represents that three relationships may exist. For example, A and/or B may represent the following three cases: Only A exists, both A and B exist, and only B exists.

The following terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features. In the descriptions of the embodiments, unless otherwise specified, "a plurality of" means two or more.

In a common interaction scenario, devices work independently. Because an intelligent terminal device is not around, a user may miss an important notification received by the intelligent terminal device. A wearable device, such as a smartwatch, a smart band, a smart headset, or smart glasses, is attached to the user, and is very suitable for notification. However, because of a small screen or no screen, the smartwatch, the smart band, the smart headset, or the smart glasses may not be suitable for displaying more detailed content or performing an operation of processing a notification. Therefore, after the user receives a notification, if the user wants to view details or process the notification, the user needs to switch to a terminal device such as a mobile phone or a personal computer to perform an operation. The user needs to first open a corresponding application on the terminal device such as the mobile phone or the personal computer, and then find the notification and corresponding content before viewing the notification. Devices work independently and cannot cooperate with each other. Consequently, operations are relatively complex and experience is poor.

The embodiments of this application provide a notification processing method. When an electronic device generates a notification, a proper device in an environment in which a user is located may be used as a prompt device to prompt the notification, to enhance a capability of cooperation between devices. In addition, by selecting or confirming a continuation device on the prompt device, a task corresponding to the notification may be conveniently switched to the continuation device for execution, to further enhance capabilities of interaction and cooperation between devices. In this way, a plurality of devices can cooperate with each other to process the task corresponding to the notification, to enhance a capability of information processing between the plurality of devices. Therefore, the plurality of devices can cooperate with each other only by requiring fewer user operations, thereby improving user experience.

FIG. 1 is a schematic diagram of a system 10 related to a notification processing method according to some example embodiments. The system 1 may include a plurality of devices, and the devices in FIG. 1 may communicate with each other. In a non-limitative embodiment, as shown in FIG. 1, the system 10 may include a plurality of intelligent devices such as a mobile phone 11, a tablet computer 12, smart glasses 13, a watch 14, a speaker 15, a smart screen 16, and a notebook computer 17. In addition, the devices in the system 10 may further include a device such as a media player (for example, MP3 or MP4), an ultra-mobile personal computer (ultra-mobile personal computer, UMPC), a personal digital assistant (personal digital assistant, PDA), a wireless headset, a smart band, a wireless vehicle-mounted device, an augmented reality (augmented reality, AR)/virtual reality (virtual reality, VR) device, or a TV.

The device in the system 10 generates a notification, and the notification is used to prompt that a specified event is met. Without limitation, an application (Application, App) used to generate the notification may be installed on the device, and the application generates a notification when a specified event is met. Alternatively, the notification is generated by the system including the device, and the system generates a notification when detecting that a specified event is met. When a device generates a notification, the device may be referred to as a source device. For example, when the mobile phone 11 is used as a source device, an email application is installed on the mobile phone 11. When there is a new email, the mobile phone 11 may generate a notification of a "new email", and may display the notification in a notification bar of the mobile phone. For another example, when the mobile phone 11 receives an SMS message, the mobile phone 11 may generate a notification of an "unread SMS message", and may display the notification in a notification bar of the mobile phone. The mobile phone 11 determines whether the system includes a device that can be configured to prompt the mobile phone 11 to generate a notification or execute a task corresponding to the notification.

A specific implementation in which the mobile phone 11 determines whether there is a device that can be configured to prompt the mobile phone 11 to generate a notification or execute a task corresponding to the notification may be as follows: After the mobile phone 11 generates a notification, the mobile phone 11 determines whether there is a device (used as a prompt device) within a specific distance range that can be configured to prompt the mobile phone 11 to generate a notification, and determine whether there is a device (used as a continuation device) that can execute a task corresponding to the notification. For example, in some embodiments, an example in which the mobile phone 11 generates a notification of a "new email" is used. The mobile phone 11 may determine whether the system 10 includes a device that has an interaction capability, and may further determine whether the device is relatively close to a user. When the conditions are met, the device may be used as a prompt device, to prompt the user that the mobile phone 11 generates a notification of a "new email". In addition, the mobile phone 11 may determine that the system 10 includes a device that can execute a task corresponding to the notification, and that the device is relatively close to the user. In this case, the device may be used as a continuation device, to execute the task corresponding to the notification. Therefore, the prompt device may prompt that the mobile phone 11 receives a "new email", and the task corresponding to the notification may be switched to the continuation device for execution by using the prompt device, so as to improve a capability of cooperation between devices in the system 10.

In a non-limitative embodiment, when an environment in which the system 10 is located is an environment such as a home, a plurality of devices may be located in a same local area network. As shown in FIG. 1, the system 10 may further include a router 101. The router 101 in the system 10 may be disposed as an access point (access point, AP), to provide a signal source of a network. Further, each device in the system 10 may be used as a station (station, STA) to connect to the router 101. The router 101 may communicate with each device over a wired network or a wireless network. For example, a Wi-Fi link is established between devices by using a wireless fidelity (wireless fidelity, Wi-Fi) protocol, so as to implement communication between the devices. A specific implementation may be as follows: A peer-to-peer (peer-to-peer, P2P) connection (or referred to as a Wi-Fi direct (Wi-Fi Direct) connection) is established between the devices, or the devices access a same router 101, so as to implement communication between the devices. In some other embodiments, a Bluetooth link may alternatively be established between devices by using a Bluetooth protocol, so as to implement communication between the devices based on the Bluetooth link. Alternatively, devices may communicate with each other over a mobile network or the internet.

Figure 2:
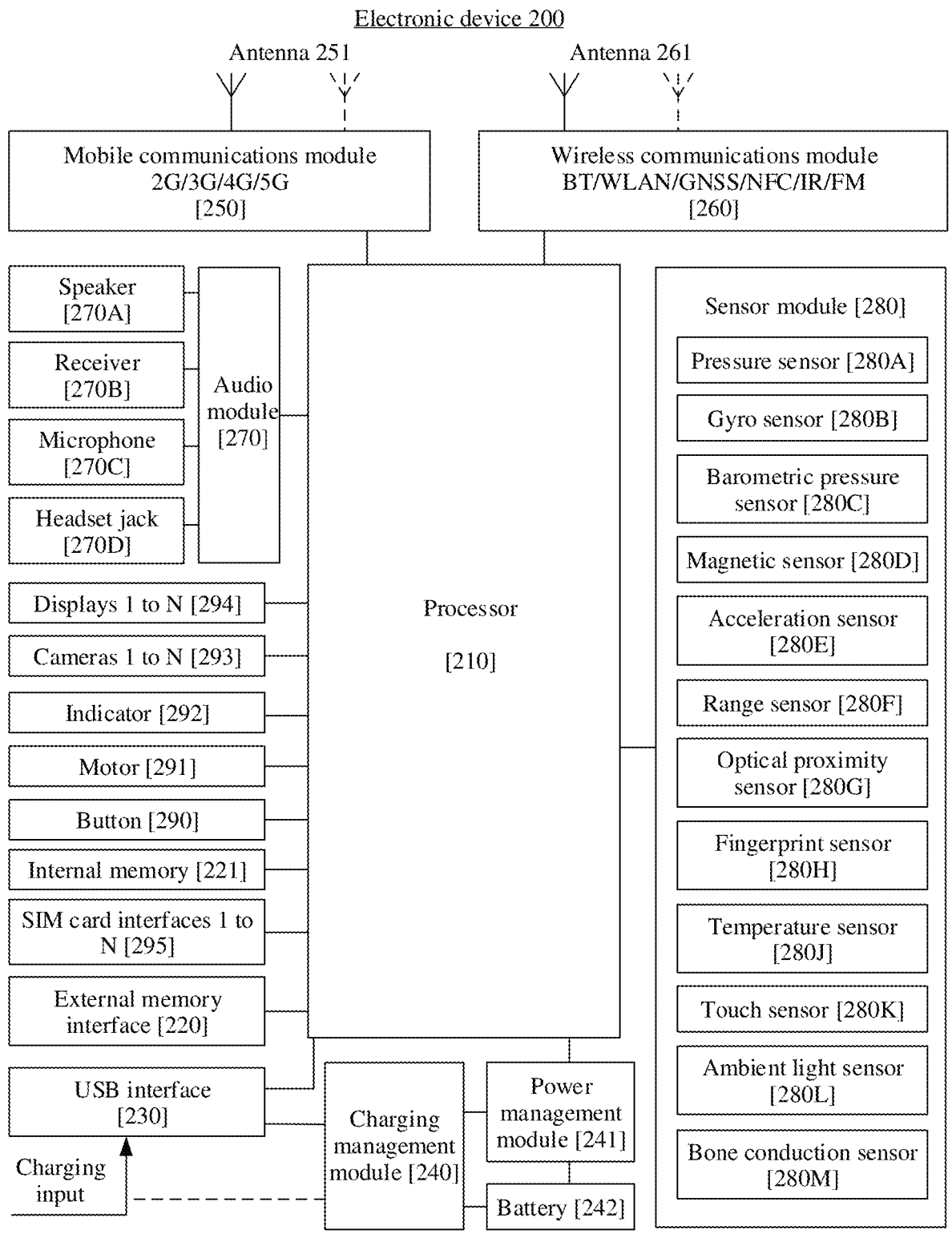
FIG. 2 is a schematic diagram of a structure of an electronic device according to an embodiment of this application.

FIG. 2 is a schematic diagram of a structure of an electronic device 200 according to an embodiment of this application. Structures of the foregoing devices (including the source device, the prompt device, and the continuation device) may be shown in FIG. 2.

The electronic device 200 may include a processor 210, an external memory interface 220, an internal memory 221, a universal serial bus (universal serial bus, USB) interface 230, a charging management module 240, a power management module 241, a battery 242, an antenna 1, an antenna 2, a mobile communications module 250, a wireless communications module 260, an audio module 270, a speaker 270A, a receiver 270B, a microphone 270C, a headset jack 270D, a sensor module 280, a button 290, a motor 291, an indicator 292, a camera 293, a display 294, a subscriber identification module (subscriber identification module, SIM) card interface 295, and the like. The sensor module 280 may include a pressure sensor 280A, a gyro sensor 280B, a barometric pressure sensor 280C, a magnetic sensor 280D, an acceleration sensor 280E, a range sensor 280F, an optical proximity sensor 280G, a fingerprint sensor 280H, a temperature sensor 280J, a touch sensor 280K, an ambient light sensor 280L, a bone conduction sensor 280M, and the like.

It may be understood that the structure shown in this embodiment of the present invention does not constitute a specific limitation on the electronic device 200. In some other embodiments of this application, the electronic device 200 may include more or fewer components than those shown in the figure, or some components may be combined, or some components may be split, or different component arrangements may be used. The components shown in the figure may be implemented by hardware, software, or a combination of software and hardware.

The processor 210 may include one or more processing units. For example, the processor 210 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural network processing unit (neural network processing unit, NPU). Different processing units may be independent components, or may be integrated into one or more processors.

The controller may generate an operation control signal based on instruction operation code and a time sequence signal, to complete control of instruction reading and instruction execution.

A memory may be further disposed in the processor 210, and is configured to store instructions and data. In some embodiments, the memory in the processor 210 is a cache memory. The memory may store instructions or data just used or cyclically used by the processor 210. If the processor 210 needs to use the instructions or the data again, the processor 210 may directly call the instructions or the data from the memory. This avoids repeated access and reduces a waiting time of the processor 210. Therefore, system efficiency is improved.

In some embodiments, the processor 210 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes one serial data line (serial data line, SDA) and one serial clock line (serial clock line, SCL). In some embodiments, the processor 210 may include a plurality of groups of I2C buses. The processor 210 may be coupled to the touch sensor 280K, a charger, a flash, the camera 293, and the like through different I2C bus interfaces. For example, the processor 210 may be coupled to the touch sensor 280K through the I2C interface, so that the processor 210 communicates with the touch sensor 280K through the I2C bus interface, to implement a touch function of the electronic device 200.

The I2S interface may be configured to perform audio communication. In some embodiments, the processor 210 may include a plurality of groups of I2S buses. The processor 210 may be coupled to the audio module 270 by using the I2S bus, to implement communication between the processor 210 and the audio module 270. In some embodiments, the audio module 270 may transfer an audio signal to the wireless communications module 260 through the I2S interface, to implement a function of answering a call by using a Bluetooth headset.

The PCM interface may also be configured to perform audio communication, and sample, quantize, and code an analog signal. In some embodiments, the audio module 270 may be coupled to the wireless communications module 260 through a PCM bus interface. In some embodiments, the audio module 270 may alternatively transfer an audio signal to the wireless communications module 260 through the PCM interface, to implement a function of answering a call by using a Bluetooth headset. Both the I2S interface and the PCM interface may be configured to perform audio communication.

The UART interface is a universal serial data bus, and is configured to perform asynchronous communication. The bus may be a two-way communications bus, and converts to-be-transmitted data between serial communication and parallel communication. In some embodiments, the UART interface is usually configured to connect the processor 220 to the wireless communications module 260. For example, the processor 220 communicates with a Bluetooth module in the wireless communications module 260 through the UART interface, to implement a Bluetooth function. In some embodiments, the audio module 270 may transfer an audio signal to the wireless communications module 260 through the UART interface, to implement a function of playing music by using a Bluetooth headset.

The MIPI interface may be configured to connect the processor 210 and a peripheral component such as the display 294 or the camera 293. The MIPI interface includes a camera serial interface (camera serial interface, CSI), a display serial interface (display serial interface, DSI), and the like. In some embodiments, the processor 210 communicates with the camera 293 through the CSI interface, to implement a photographing function of the electronic device 200. The processor 220 communicates with the display 294 through the DSI interface, to implement a display function of the electronic device 200.

The GPIO interface may be configured by using software. The GPIO interface may be configured as a control signal or a data signal. In some embodiments, the GPIO interface may be configured to connect the processor 210 to the camera 293, the display 294, the wireless communications module 260, the audio module 270, the sensor module 280, or the like. The GPIO interface may alternatively be configured as the I2C interface, the I2S interface, the UART interface, the MIPI interface, or the like.

The USB interface 230 is an interface that conforms to a USB standard specification, and may be specifically a mini USB interface, a micro USB interface, a USB Type-C interface, or the like. The USB interface 230 may be configured to connect to the charger to charge the electronic device 200, or may be configured to perform data transmission between the electronic device 200 and a peripheral device, may be configured to connect to a headset to play audio by using the headset, or may be configured to connect to another electronic device such as an AR device.

It may be understood that an interface connection relationship between the modules illustrated in this embodiment of the present invention is merely an example for description, and does not constitute a limitation on the structure of the electronic device 200. In some other embodiments of this application, the electronic device 200 may alternatively use an interface connection manner that is different from that in the foregoing embodiment, or a combination of a plurality of interface connection manners.

The charging management module 240 is configured to receive a charging input from the charger. The charger may be a wireless charger or a wired charger. In some embodiments of wired charging, the charging management module 240 may receive a charging input of the wired charger through the USB interface 230. In some embodiments of wireless charging, the charging management module 240 may receive a wireless charging input by using a wireless charging coil of the electronic device 200. The charging management module 240 may further supply power to the electronic device through the power management module 241 while charging the battery 242.

The power management module 241 is configured to connect the battery 242 and the charging management module 240 to the processor 210. The power management module 241 receives an input of the battery 242 and/or the charging management module 240, and supplies power to the processor 210, the internal memory 221, the display 294, the camera 293, the wireless communications module 260, and the like. The power management module 241 may be further configured to monitor parameters such as a battery capacity, a battery cycle count, and a battery health status (an electric leakage or impedance). In some other embodiments, the power management module 241 may alternatively be disposed in the processor 210. In some other embodiments, the power management module 241 and the charging management module 240 may alternatively be disposed in a same device.

A wireless communication function of the electronic device 200 may be implemented through the antenna 1, the antenna 2, the mobile communications module 250, the wireless communications module 260, the modem processor, the baseband processor, and the like.

The antenna 1 and the antenna 2 are configured to transmit and receive electromagnetic wave signals. Each antenna in the electronic device 200 may be configured to cover one or more communications frequency bands. Different antennas may be further multiplexed, to increase antenna utilization. For example, the antenna 1 may be multiplexed as a diversity antenna in a wireless local area network. In other embodiments, the antenna may be used in combination with a tuning switch.

The mobile communications module 250 can provide a solution, applied to the electronic device 200, to wireless communication including 2G/3G/4G/5G, and the like. The mobile communications module 250 may include at least one filter, a switch, a power amplifier, a low noise amplifier (low noise amplifier, LNA), and the like. The mobile communications module 250 may receive an electromagnetic wave by using the antenna 1, perform processing such as filtering or amplification on the received electromagnetic wave, and transfer the electromagnetic wave to the modem processor for demodulation. The mobile communications module 250 may further amplify a signal modulated by the modem processor, and convert the signal into an electromagnetic wave for radiation by using the antenna 1. In some embodiments, at least some function modules in the mobile communications module 250 may be disposed in the processor 210. In some embodiments, at least some function modules in the mobile communications module 250 may be disposed in a same device as at least some modules in the processor 210.

The modem processor may include a modulator and a demodulator. The modulator is configured to modulate a low frequency baseband signal to be sent into a medium and high frequency signal. The demodulator is configured to demodulate a received electromagnetic wave signal into a low frequency baseband signal. Then, the demodulator transmits the low frequency baseband signal obtained through demodulation to the baseband processor for processing. The low-frequency baseband signal is processed by the baseband processor, and then transmitted to the application processor. The application processor outputs a sound signal by using an audio device (not limited to the speaker 270A, the receiver 270B, or the like), or displays an image or a video by using the display 294. In some embodiments, the modem processor may be an independent device. In some other embodiments, the modem processor may be independent of the processor 210, and is disposed in a same device as the mobile communications module 250 or another function module.

The wireless communications module 260 may provide a solution, applied to the electronic device 200, to wireless communication including a wireless local area network (wireless local area network, WLAN) (for example, a wireless fidelity (wireless fidelity, Wi-Fi) network, Bluetooth (Bluetooth, BT), a global navigational satellite system (global navigation satellite system, GNSS), frequency modulation (frequency modulation, FM), near field communication (near field communication, NFC), an infrared (infrared, IR) technology, and the like. The wireless communications module 260 may be one or more devices integrating at least one communications processing module. The wireless communications module 260 receives an electromagnetic wave through the antenna 2, performs frequency modulation and filtering processing on an electromagnetic wave signal, and sends a processed signal to the processor 210. The wireless communications module 260 may further receive a to-be-sent signal from the processor 210, perform frequency modulation and amplification on the signal, and convert the signal into an electromagnetic wave for radiation through the antenna 2.

In some embodiments, the antenna 1 and the mobile communications module 250 in the electronic device 200 are coupled, and the antenna 2 and the wireless communications module 260 in the electronic device 200 are coupled, so that the electronic device 200 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-CDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device 200 implements a display function through the GPU, the display 294, the application processor, and the like. The GPU is a microprocessor for image processing, and is connected to the display 294 and the application processor. The GPU is configured to perform mathematical and geometric calculation, and render an image. The processor 210 may include one or more GPUs that execute program instructions to generate or change display information.

The display 294 is configured to display an image, a video, and the like. The display 294 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flex light-emitting diode, FLED), a mini-LED, a micro-LED, a micro-OLED, a quantum dot light-emitting diode (quantum dot light-emitting diode, QLED), or the like. In some embodiments, the electronic device 200 may include one or N displays 294, where N is a positive integer greater than 1.

The electronic device 200 can implement a photographing function through the ISP, the camera 293, the video codec, the GPU, the display 294, the application processor, and the like.

The ISP is configured to process data fed back by the camera 293. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 293.

The camera 293 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as RGB or YUV. In some embodiments, the electronic device 200 may include one or N cameras 293, where N is a positive integer greater than 1.

The digital signal processor is configured to process a digital signal, and may further process another digital signal in addition to the digital image signal. For example, when the electronic device 200 selects a frequency, the digital signal processor is configured to perform Fourier transform on frequency energy and the like.

The video codec is configured to compress or decompress a digital video. The electronic device 200 may support one or more video codecs. In this way, the electronic device 200 can play or record videos in a plurality of encoding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a transfer mode between human brain neurons, and may further continuously perform self-learning. The NPU can implement applications such as intelligent cognition of the electronic device 200, such as image recognition, facial recognition, speech recognition, and text understanding.

The external memory interface 220 may be configured to connect to an external storage card such as a micro SD card, to extend a storage capability of the electronic device 200. The external storage card communicates with the processor 210 through the external memory interface 220, to implement a data storage function. For example, files such as music and videos are stored in the external storage card.

The internal memory 221 may be configured to store computer-executable program code. The executable program code includes instructions. The internal memory 221 may include a program storage area and a data storage area. The program storage area may store an operating system, an application required by at least one function (for example, a sound playing function or an image playing function), and the like. The data storage area may store data (for example, audio data or an address book) created during use of the electronic device 200, and the like. In addition, the internal memory 221 may include a high-speed random access memory, or may include a nonvolatile memory such as at least one magnetic disk storage device, a flash memory, or a universal flash storage (universal flash storage, UFS). The processor 210 runs the instructions stored in the internal memory 221 and/or the instructions stored in the memory disposed in the processor, to perform various function applications of the terminal device 200 and data processing.

The electronic device 200 may implement an audio function such as music playing or recording by using the audio module 270, the speaker 270A, the receiver 270B, the microphone 270C, the headset jack 270D, the application processor, and the like.

The button 290 includes a power key, a volume key, and the like. The button 290 may be a mechanical key, or may be a touch button. The electronic device 200 may receive a key input, and generate a key signal input related to a user setting and function control of the electronic device 200.

The motor 291 may generate a vibration prompt. The motor 291 may be configured to provide an incoming call vibration prompt, or may be configured to provide a touch vibration feedback. For example, touch operations performed on different applications (for example, photographing and audio playing) may correspond to different vibration feedback effects. The motor 291 may also provide different vibration feedback effects that correspond to touch operations performed on different areas of the display 294. Different application scenarios (for example, a time reminder, information receiving, an alarm clock, and a game) may also correspond to different vibration feedback effects. A touch vibration feedback effect may be further customized.

The indicator 292 may be an indicator light, and may be configured to indicate a charging status and a power change, or may be configured to indicate a message, a missed call, a notification, and the like.

The SIM card interface 295 is configured to connect to a SIM card. The SIM card may be inserted into the SIM card interface 295 or detached from the SIM card interface 295, to come into contact with or be separated from the electronic device 200. The electronic device 200 may support one or N SIM card interfaces, where N is a positive integer greater than 1. The SIM card interface 295 may support a nano-SIM card, a micro-SIM card, a SIM card, and the like. A plurality of cards may be simultaneously inserted into a same SIM card interface 295. The plurality of cards may be of a same type or of different types. The SIM card interface 295 may also be compatible with different types of SIM cards. The SIM card interface 295 may also be compatible with the external storage card. The electronic device 200 interacts with a network by using the SIM card, to implement functions such as conversation and data communication. In some embodiments, the electronic device 200 uses an eSIM, namely, an embedded SIM card. The eSIM card may be embedded into the electronic device 200, and cannot be separated from the electronic device 200.

A software system of the electronic device 200 may use a layered architecture, an event-driven architecture, a micro-kernel architecture, a micro service architecture, or a cloud architecture. In this embodiment of the present invention, an Android system with a layered architecture is used as an example to describe a software structure of the electronic device 200.

Figure 3:
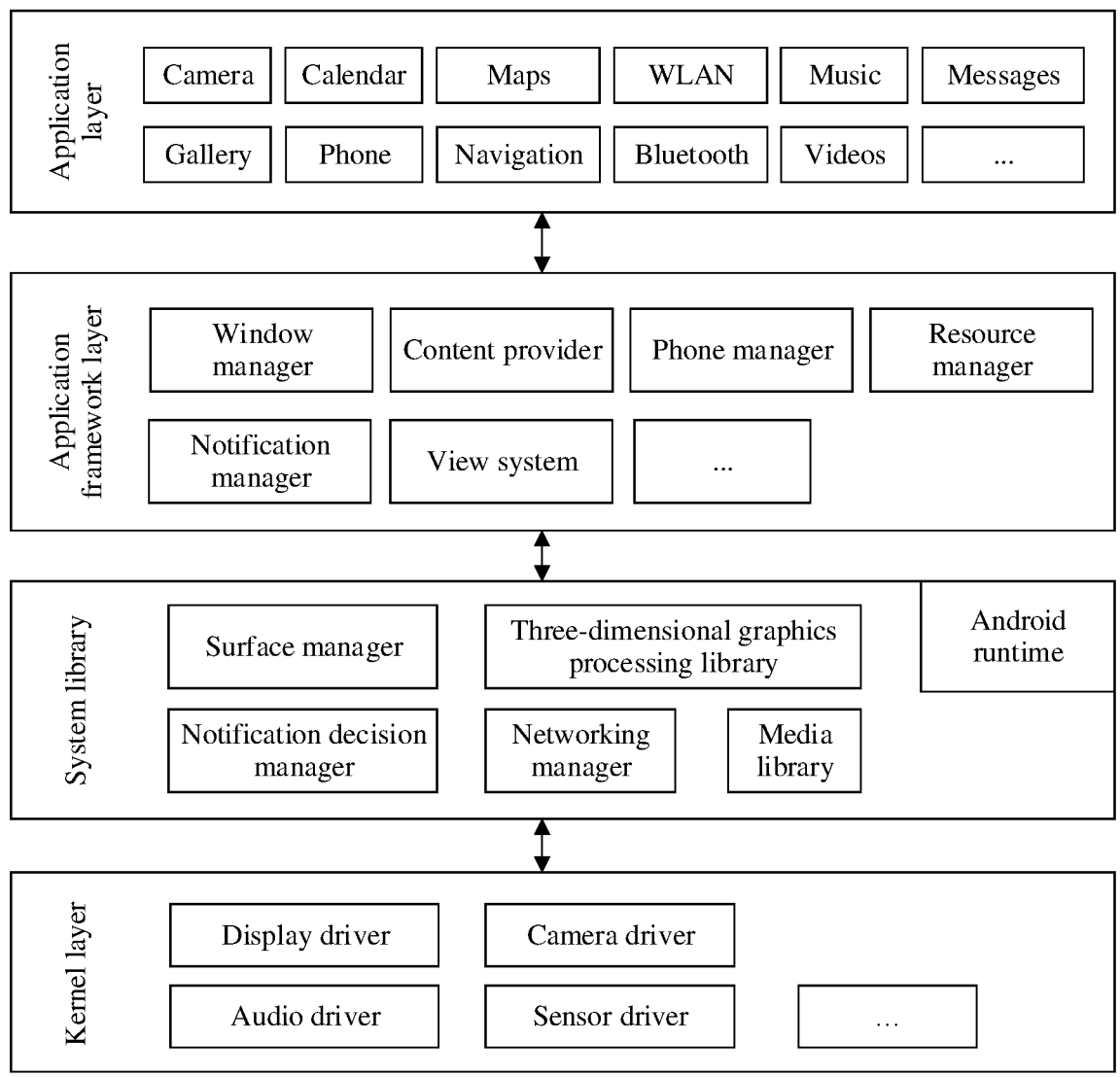
FIG. 3 is a block diagram of a software structure of an electronic device according to an embodiment of this application.

FIG. 3 is a block diagram of the software structure of the electronic device 200 according to an embodiment of the present invention.

In a layered architecture, software is divided into several layers, and each layer has a clear role and task. The layers communicate with each other through a software interface. In some embodiments, an Android system is divided into four layers: an application layer, an application framework layer, an Android runtime (Android runtime) and system library, and a kernel layer from top to bottom.

The application layer may include a series of application packages.

As shown in FIG. 3, the application packages may include applications such as Camera, Gallery, Calendar, Phone, Maps, Navigation, WLAN, Bluetooth, Music, Videos, and Messages.

The application framework layer provides an application programming interface (application programming interface, API) and a programming framework for an application at the application layer. The application framework layer includes some predefined functions.

As shown in FIG. 3, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to: store and obtain data, and enable the data to be accessed by an application. The data may include a video, an image, audio, calls that are made and answered, a browsing history and a bookmark, a phone book, and the like.

The view system includes visual controls, such as a control for displaying a text and a control for displaying an image. The view system may be configured to construct an application. A display interface may include one or more views. For example, a display interface including a Messages notification icon may include a text display view and a picture display view.

The phone manager is configured to provide a communication function of the electronic device 200, for example, management of a call status (including answering or declining).

The resource manager provides various resources for an application, such as a localized character string, an icon, a picture, a layout file, and a video file.

The notification manager enables an application to display notification information in a status bar, and may be configured to convey a notification type message, where the displayed notification information may automatically disappear after a short pause and require no user interaction. For example, the notification manager is configured to notify download completion, provide a message notification, and the like. The notification manager may alternatively be a notification that appears in a top status bar of the system in a form of a graph or a scroll bar text, for example, a notification of an application running on the background or a notification that appears on the screen in a form of a dialog window. For example, text information is displayed in the status bar, an alert sound is played, the electronic device vibrates, or the indicator light blinks.

The Android runtime includes a kernel library and a virtual machine. The Android runtime is responsible for scheduling and management of the Android system.

The kernel library includes two parts: a function that needs to be called in Java language, and a kernel library of Android.

The application layer and the application framework layer run on the virtual machine. The virtual machine executes Java files at the application layer and the application framework layer as binary files. The virtual machine is configured to perform functions such as object life cycle management, stack management, thread management, security and exception management, and garbage collection.

The system library may include a plurality of function modules, for example, a surface manager (surface manager), a media library (Media Library), and a three-dimensional graphics processing library (for example, OpenGL ES).

The surface manager is configured to manage a display subsystem and provide fusion of 2D and 3D layers for a plurality of applications.

The media library supports play and recording of audio and video in a plurality of commonly used formats, static image files, and the like. The media library may support a plurality of audio and video coding formats, such as MPEG-4, H.264, MP3, AAC, AMR, JPG, and PNG.

The three-dimensional graphics processing library is configured to implement three-dimensional graphics drawing, image rendering, composition, layer processing, and the like.

The kernel layer is a layer between hardware and software. The kernel layer includes at least a display driver, a camera driver, an audio driver, and a sensor driver.

The following describes examples of working procedures of software and hardware of the electronic device 200 with reference to a photographing scenario.

When the touch sensor 280K receives a touch operation, a corresponding hardware interrupt is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event. For example, the touch operation is a touch tap operation, and a control corresponding to the tap operation is a control of a camera application icon. A camera application invokes an interface at the application framework layer to enable the camera application, then enables a camera driver by invoking the kernel layer, and captures a static image or a video by using the camera 293.

In a non-limitative embodiment, as shown in FIG. 3, the system library may further include a networking manager 320. The networking manager 320 is configured to discover a device in the system 10. The discovered device may be selected as a prompt device and/or a continuation device. In some embodiments, when devices in the system 10 are connected to a same AP to form a local area network, the devices in the system 10 are peripheral devices of each other, or the devices in the system 10 are devices near a user. A networking manager 320 of a device in the system 10 may discover all online other devices connected to a same AP, and all the online devices connected to the same AP (including the device and the other devices in the system 10) complete networking. In some embodiments, a networking manager 320 of a device in the system 10 discovers that, in other online devices in a local area network that are connected to a same AP, an account for logging in to one or more devices is an account for the device, or an account for logging in to one or more devices is an associated account of an account for logging in to the device. In this case, another device that is logged in to by using the account or the associated account is a device trusted by the device, or all devices that are logged in to by using the account or the associated account are mutually trusted devices. Completing networking between devices that are logged in to by using an account or an associated account and that are connected to a same AP ensures notification security and privacy. In some embodiments, when devices in the system 10 communicate with each other over a mobile network or the internet, the networking manager 320 may discover, over the mobile network or the internet, that accounts for logging in to some devices in the system 10 are a same account or an associated account. In addition, when the some devices are located near a user, the some devices complete networking, to ensure notification security and privacy. The associated account may be an account authorized by the same account. Specifically, a distance between devices and a distance between a user and a device may be determined through Bluetooth received signal strength indication (Received Signal Strength Indication, RSSI) ranging or satellite positioning. The networking manager 320 may discover a device in the system 10 near the user, and may enhance capabilities of interaction and cooperation between devices, so as to prevent the user from manually searching for and filtering a device in the system 10, thereby reducing user operations, and improving efficiency.

Figure 4B:
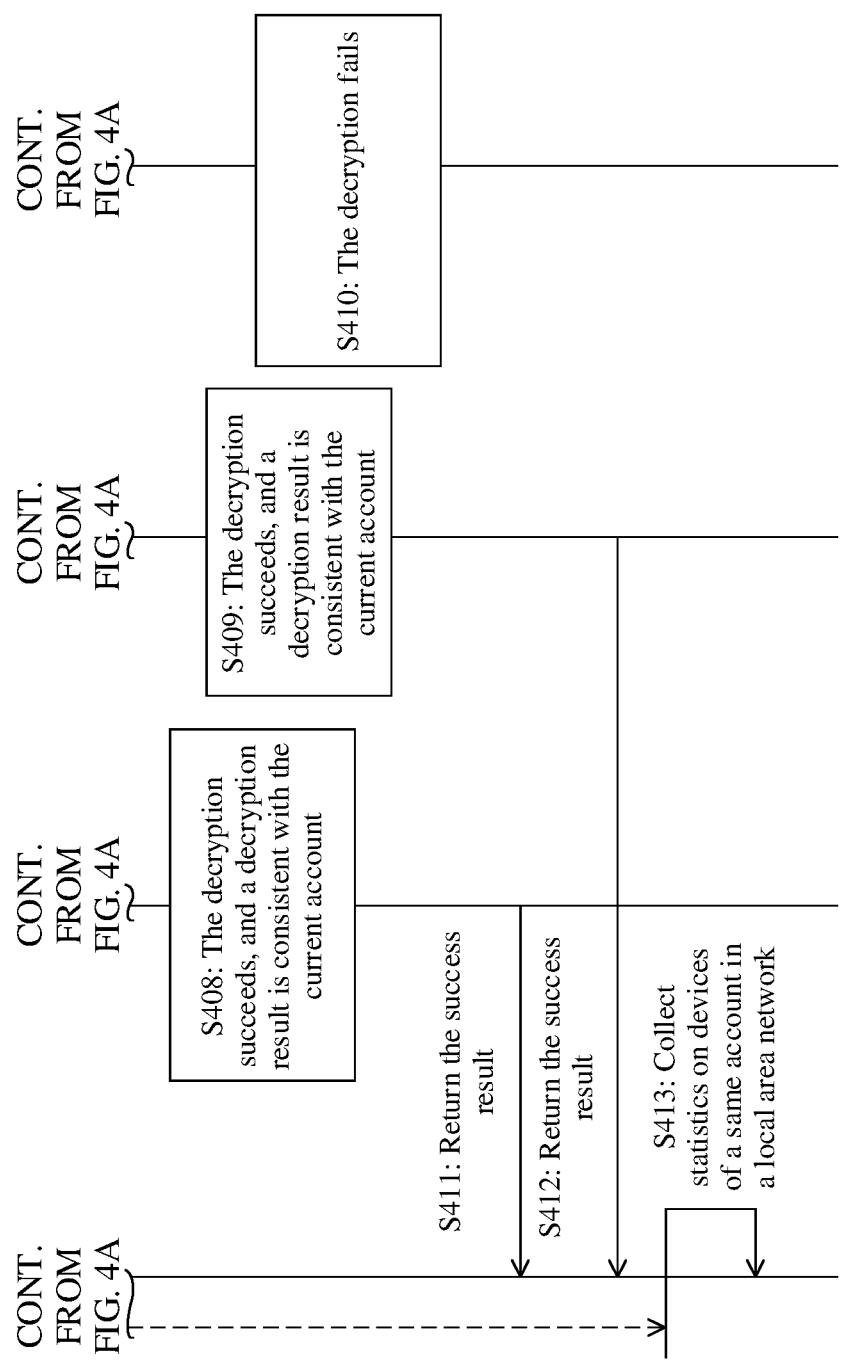

For example, as shown in FIG. 4A and FIG. 4B, when devices in the system 10 are connected to a same AP to form a local area network, a networking process of each device may include steps S401 to S404. Any device in FIG. 1 may be used as a device 121 in FIG. 4A and FIG. 4B, and another device in FIG. 1 may be used as a device 122A, a device 122B, or a device 122C. For example, when the mobile phone 11 is used as the terminal device 121, any one of the tablet computer 12, the smart glasses 13, the watch 14, the speaker 15, the smart screen 16, and the notebook computer 17 may be used as the device 122A, the device 122B, or the device 122C. The following describes the networking process in detail:

Step S401: A networking manager 320 of the device 121 reads, from a trusted zone (for example, a server), a public key corresponding to a current account (an account for the device 121), and encrypts the current account by using the public key, to generate an account ciphertext. For example, the account for the device 121 may be a Huawei account. The device 121 may first obtain, from a Huawei cloud server, a public key corresponding to the Huawei account, and then encrypt the Huawei account by using the public key, to generate an account ciphertext.

Steps S402 to S404: The device 121 starts to broadcast the account ciphertext. For example, the device 121 may perform broadcasting in a Bluetooth or P2P manner. FIG. 2 shows three devices that receive the broadcast: the device 122A, the device 122B, and the device 122C. The device 121 starts timing after sending the broadcast until a statistical time (which may be set or preset for a user, for example, 3 seconds) expires.

Steps S405 to S407: Networking managers 320 of the device 122A, the device 122B, and the device 122C respectively decrypt the account ciphertext by using respective private keys. Specifically, the device 122A reads, from the trusted zone (for example, the server), the private key corresponding to a current account (an account for the device 122A), and then decrypts the account ciphertext by using the private key. The device 122B reads, from the trusted zone (for example, the server), the private key corresponding to a current account (an account for the device 122B), and then decrypts the account ciphertext by using the private key. The device 122C reads, from the trusted zone (for example, the server), the private key corresponding to a current account (an account for the device 122C), and then decrypts the account ciphertext by using the private key. The account in this embodiment of this application may be an account provided by a cloud service provider for a user, such as Xiaomi@account, Huawei@account, or Apple@account (Apple ID), or may be an account used to log in to an application, such as WeChat@account or Google@email account. For example, if the accounts for the device 122A, the device 122B, and the device 122C are all Huawei accounts, the device 122A, the device 122B, and the device 122C may pre-obtain, from a Huawei cloud server, private keys corresponding to the Huawei accounts for the devices of the device 122A, the device 122B, and the device 122C, and store the private keys in trusted storage areas.

Steps S408 and S409: In an embodiment, the decryption by the device 122A and the decryption by the device 122B succeed. To be specific, a decryption result of the device 122A is consistent with the current account (the account for the device 122A) or an associated account, and a decryption result of the device 122B is consistent with the current account (the account for the device 122B) or an associated account.

Step S410: In an embodiment, the decryption by the device 122C fails. To be specific, a decryption result of the device 122C is inconsistent with the current account (the account for the device 122C) or an associated account, or the private key of the device 122C cannot be used to decrypt the account ciphertext. The device 122C does not need to return the result or the decryption failure result to the device 121.

Steps S411 and S412: The device 122A and the device 122B return the decryption success results to the device 121, and after the device 121 receives the results returned by the device 122A and the device 122B, the networking manager 320 of the device 121 may learn that a same account is used for the device 122A, the device 122B, and the device 121, and a network connection is established among the device 121, the device 122A, and the device 122B, to complete networking. In addition, the device 122A and the device 122B may further return device statuses of the device 122A and the device 122B to the device 121. A device status includes power-on or power-off of an electronic device, screen-off or screen-on of the device, and whether the device is worn by a user. When the device is a wearable device, the wearable device may determine, through infrared detection, heart rate monitoring, or the like, whether the wearable device is worn by the user.

In a possible embodiment, the networking process further includes step S413: When a statistical time expires, statistics are collected on devices of a same account and/or an associated account in a local area network. In the embodiment shown in FIG. 2, there are two devices of a same account and/or an associated account as the device 121 in the local area network: the device 122A and the device 122B. A network connection is established among the device 121, the device 122A, and the device 122B to complete networking, and the devices that establish the networking may send messages to each other.

It can be learned that another device decrypts an account ciphertext by using a private key corresponding to an account for the another device. If the decryption succeeds, it indicates that the another device and a device that sends the account ciphertext are mutually trusted devices, and a networking manager 320 of the device may perform authentication on the another device according to the foregoing method. In this way, a notification on one device of the user can be notified across devices and switched to a more appropriate device for processing. In addition, security of data access and information transmission between devices is ensured.

Figure 5:
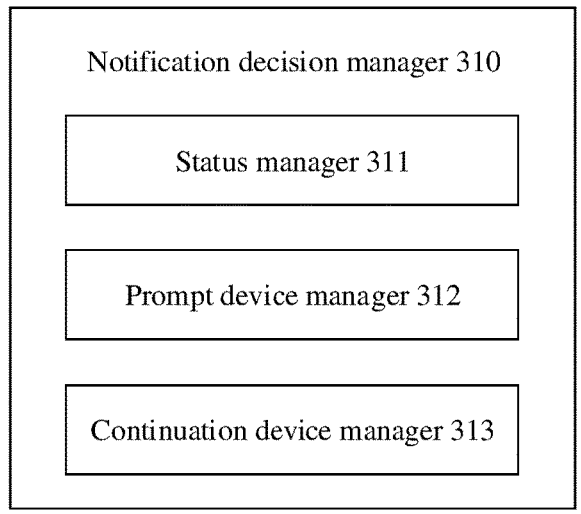
FIG. 5 is a block diagram of a structure of a notification decision manager according to an embodiment of this application.

The system library may further include a notification decision manager 310. The notification decision manager 310 is configured to: determine whether a background service notification received by a current device needs to be sent to another device for prompting, and determine a device that needs to prompt the notification, and a device that needs to continue a subsequent task. The notification decision manager 310 may enhance a capability of cooperation between devices, so that a plurality of devices can cooperate with each other to process a task corresponding to a notification. In an embodiment, as shown in FIG. 5, the notification decision manager 310 includes a status manager 311, a prompt device manager 312, and a continuation device manager 313.

The status manager 311 may determine whether a notification of a source device (a notification generation device, that is, the first device) needs to be sent to another device (a prompt device or a device that prompts notification generation, that is, a second device) for prompting, so as to enhance capabilities of interaction and collaboration between devices, thereby preventing the user from missing an important notification. The status manager 311 may perform determining based on first reference information. In an embodiment, the first reference information may include a type of a notification, a type of a notification service (Service), a status of a device (the source device), and whether the user processes the notification in time. This may enhance a capability of cooperation between devices. The type of the notification may include a leftmost screen notification (a notification on the leftmost screen), a banner notification, a status bar notification, a lock screen notification, and the like. The type of the notification service may include a music service, a video play service, a video call service, an email service, and the like. The type of the notification and the type of the notification service may be set by the system, or may be set according to a selection of the user, for example, a specific notification that is a leftmost screen notification, a banner notification, a status bar notification, or a lock screen notification. The user may also set that a notification service of a type such as an email service or a video play service needs to be sent to another device for prompting. The status of the device may include whether the device is being used. Specifically, whether the device is being used may be determined by determining whether the device is powered on or powered off, whether a screen of the device is turned on or turned off, or whether the device is worn by a user. In an embodiment, if the type of the notification service is a relatively important type such as a video call service or an email service, and the user does not process the notification (or the source device is in a screen-off and unused state) within a preset time, the status manager 311 determines that the notification needs to be sent to another device (the prompt device) for prompting. In an embodiment, when the source device is executing a first task, the source device receives a notification of executing a second task. If executing the second task affects execution of the first task, the status manager 311 may determine that the notification needs to be switched to another device (a continuation device or a device that executes a task corresponding to the notification, that is, a third device) for execution.

The prompt device manager 312 determines, based on second reference information of the devices in the system 10, a specific device in the system 10 that can be used as the prompt device, so as to enhance capabilities of interaction and cooperation between devices, thereby preventing the user from missing an important notification. The second reference information includes but is not limited to a use status of a device and a physical characteristic of the device. The use status of the device may include power-on or power-off of the device, screen-off or screen-on of the device, whether the device is worn by a user, a distance between the device and the user, and the like. The physical characteristic of the device may include a privacy attribute of the device, a display capability of the device, an audio capability of the device, an interaction capability of the device, and the like. For example, for physical characteristics of several devices and types of notification services that can be executed by the devices, refer to Table 1. For example, in an embodiment, the mobile phone 11 generates a notification, and the status manager 311 determines that the mobile phone 11 is in a screen-off state, and needs to send the notification to another device for prompting. The prompt device manager 312 learns that the watch 14 in the system 10 is worn by the user, the watch 14 has good privacy, and the watch 14 may display notification text and has an interaction capability. Therefore, the watch 14 may be used as the prompt device to prompt the source device to generate the notification. In some embodiments, the prompt device manager 312 may further determine a prompt mode based on an interaction capability of the prompt device. For example, when the prompt device is the watch 14, the prompt mode may be a text prompt and a vibration prompt. When the prompt device is a speaker, the prompt mode may be a voice prompt. In some embodiments, the prompt device manager 312 may select a suitable device from the other devices during the networking to serve as the prompt device.

TABLE 1

| Device | Physical characteristic | Type of a task that can be executed |
| --- | --- | --- |
| Smart screen | Large screen, clear display, good audio quality, and difficult touch interaction | Video play and large image preview |
| Speaker | Good audio quality, far-field radio, voice interaction, and no-screen display | Audio play and voice notification |
| Computer | Large screen for complex/precise operations | File processing and office |
| Tablet computer | Large screen, touchscreen, and good privacy | Streaming media content play, large image preview, payment, login, input, authentication, power-on and power-off of an IoT device, TV remote control, and notification processing |

TABLE 1-continued

| Device | Physical characteristic | Type of a task that can be executed |
| --- | --- | --- |
| Mobile phone | Portability, convenient interaction, good privacy, and small screen | Payment, login, input, unlock, authentication, power-on and power-off of an IoT device, TV remote control, and notification processing |
| Watch or band | Portability, good privacy, and small screen | Payment, authentication, unlock, power-on and power-off of an IoT device, and notification prompt |
| ... | ... | ... |

The continuation device manager 313 determines, based on third reference information of the devices in the system 10, a specific device in the system 10 that can be used as the continuation device (the device that executes the task corresponding to the notification received by the source device), so as to save operations of searching for and filtering the continuation device by the user. The third reference information includes but is not limited to a use status of a device and a physical characteristic of the device. The use status of the device may include power-on or power-off of the device, screen-off or screen-on of the device, whether the device is worn by a user, a distance between the device and the user, and the like. The physical characteristic of the device may include a privacy attribute of the device, a display capability of the device, an audio capability of the device, an interaction capability of the device, and the like. For example, for physical characteristics of several common devices and types of notification services that can be executed by the devices, refer to Table 1. For example, in an embodiment, the mobile phone 11 generates a notification, and a service type corresponding to the notification is video play. The continuation device manager 313 may learn that the smart screen 16 in the system 10 has been turned on, and the smart screen 16 is larger than a screen of the mobile phone 11, and is more suitable for video play. Therefore, the continuation device manager 313 uses the smart screen as the continuation device to execute the service corresponding to the notification. In addition, when a plurality of devices are all suitable as continuation devices, the continuation device manager 313 may use the plurality of devices as to-be-selected continuation devices, and the user selects a specific device as the continuation device. This may further enhance a capability of cooperation between devices, so that a plurality of devices can cooperate with each other to process a task corresponding to a notification. In some embodiments, the prompt device manager 312 may select a suitable device from the other devices during the networking to serve as the continuation device.

In the embodiment shown in FIG. 5, the notification decision manager 310 is located in the system library. Therefore, regardless of a type of a notification, the notification decision manager 310 may determine whether a background service notification received by a current device needs to be sent to another device for prompting, and determine a device that needs to prompt the notification, and a device that needs to continue a subsequent task. It may be understood that, in another embodiment, the notification decision manager 310 may alternatively be encapsulated into a specific application, to determine whether a notification in the specific application needs to be sent to another device for prompting, and determine a device that needs to prompt the notification, and a device that needs to continue a subsequent task.

Figure 6:
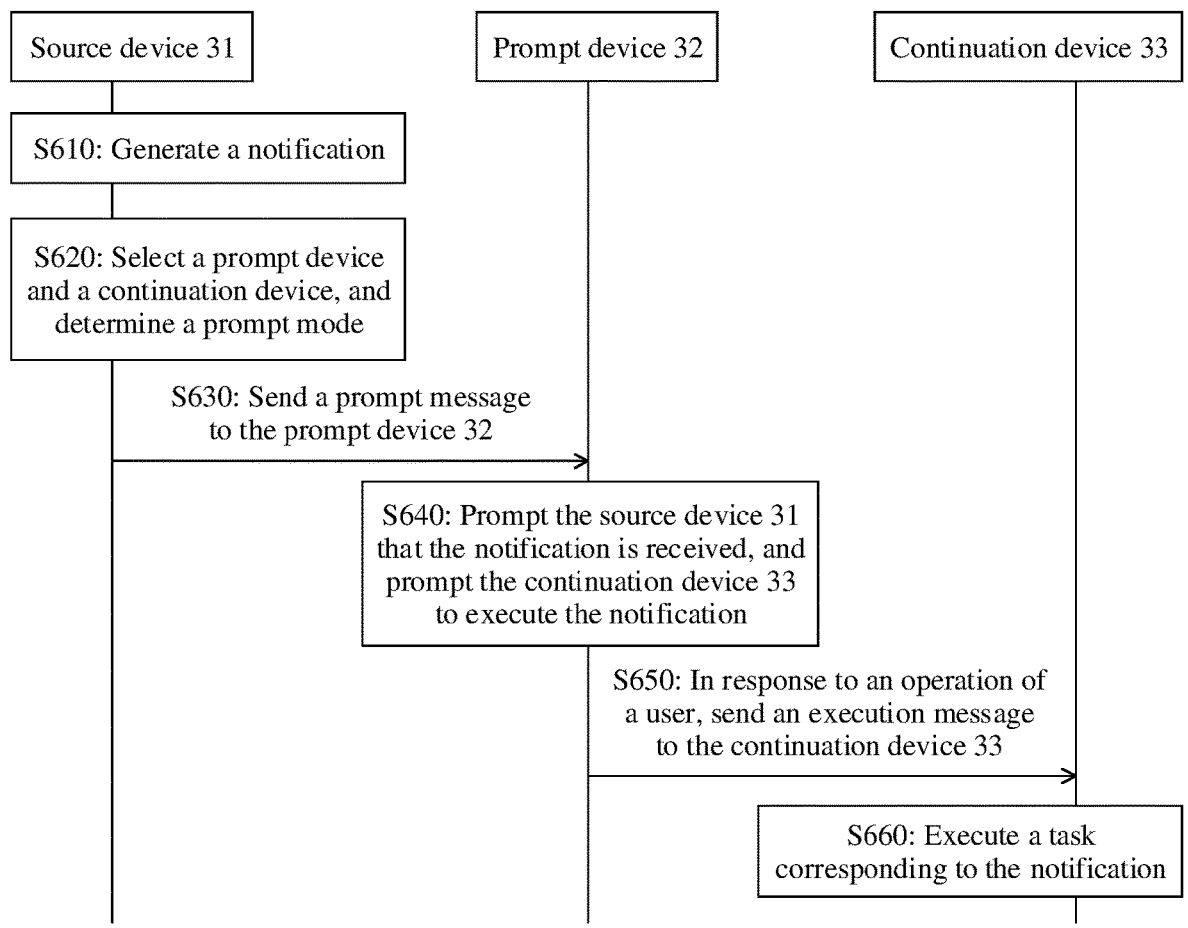
FIG. 6 is a flowchart of a notification processing method according to an embodiment of this application.

FIG. 6 is a flowchart of a notification processing method according to an embodiment. The method shown in FIG. 6 includes step S610 to step S660. The notification processing method shown in FIG. 6 is described below with reference to an application scenario.

Figure 7A:
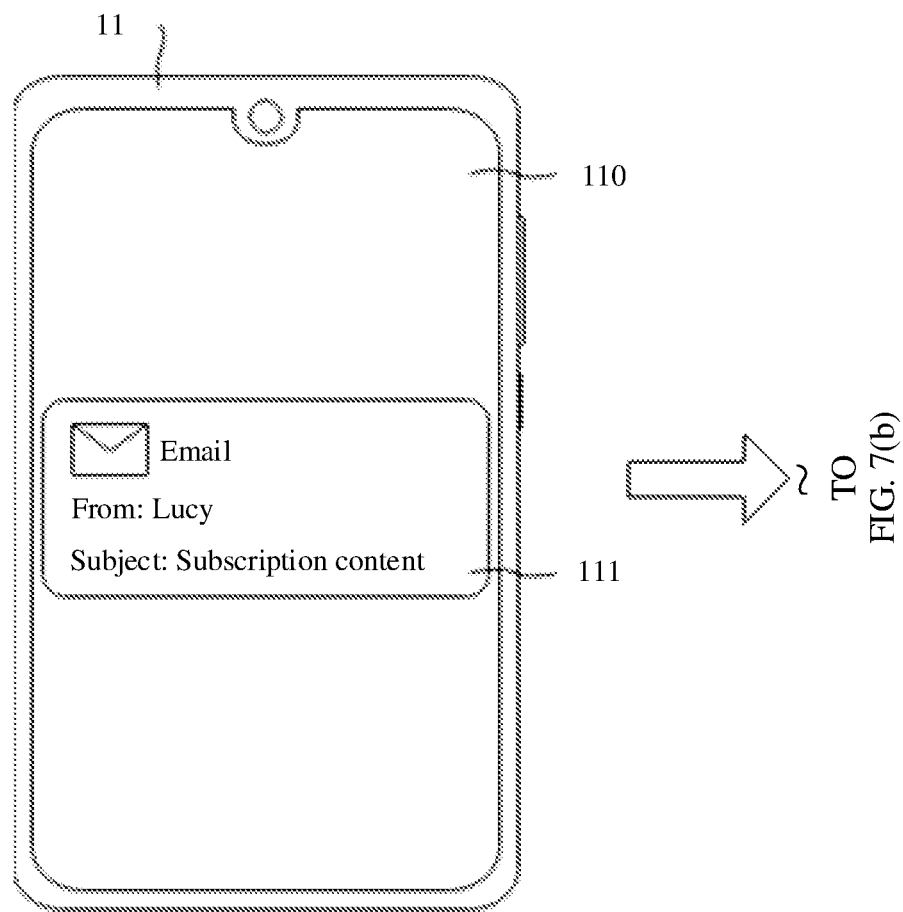
FIG. 7(a) to FIG. 7(c) are a schematic diagram of a graphical user interface of each device in a scenario according to an embodiment of this application.
Figure 7B:
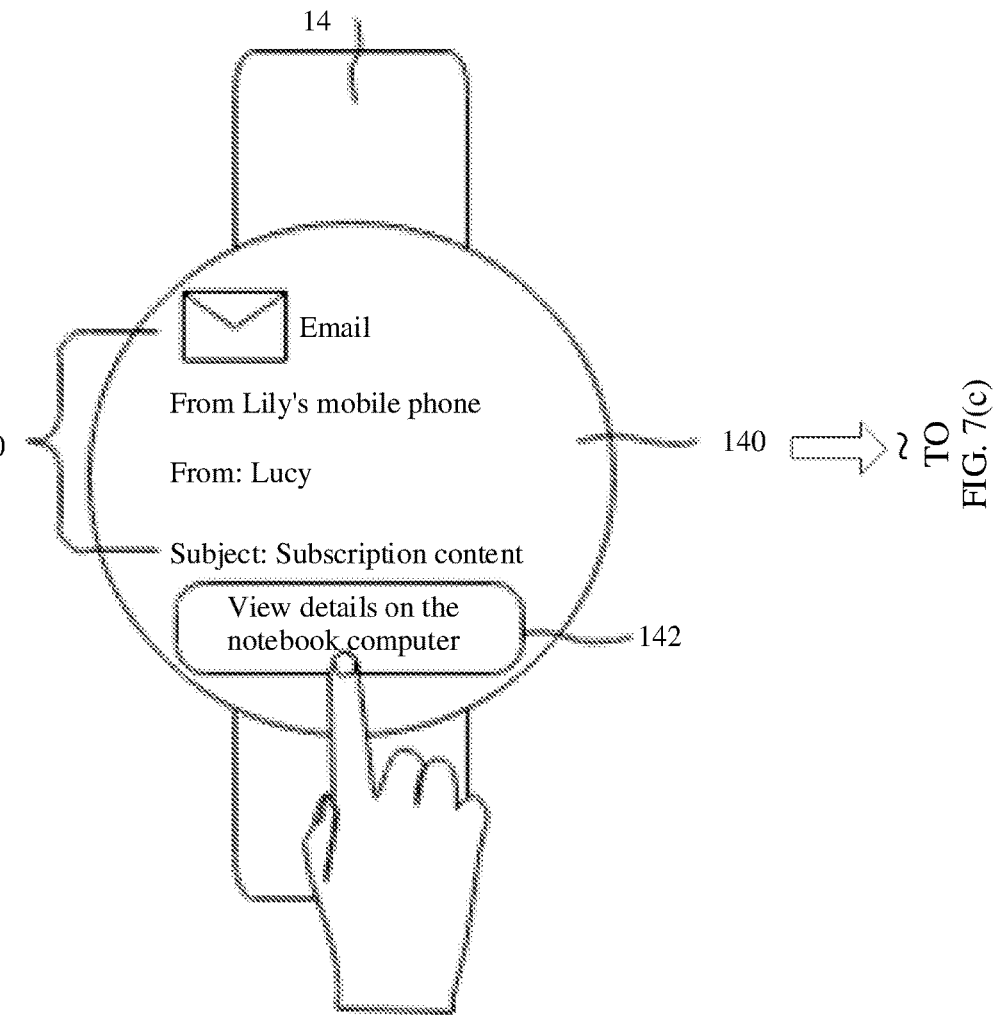
Figure 7C:
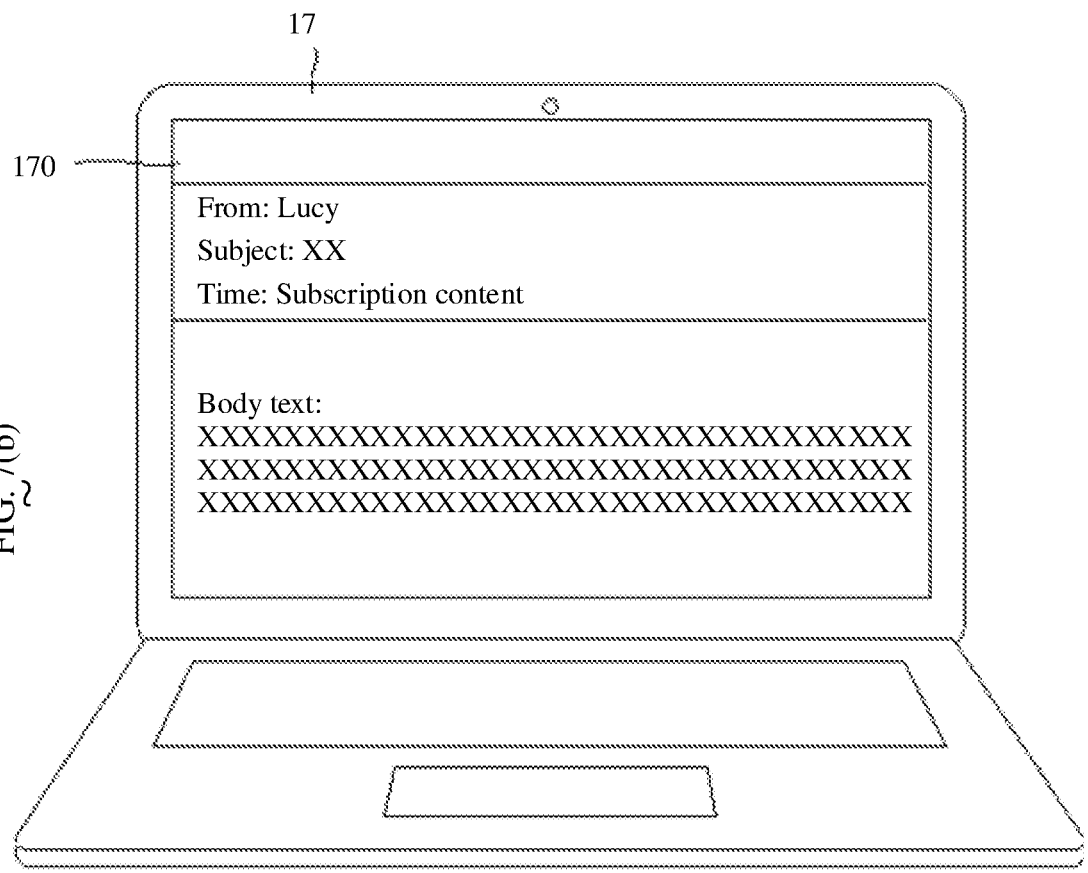

FIG. 7(a) to FIG. 7(c) are a schematic diagram of devices in an application scenario according to an embodiment. The method shown in FIG. 6 is used in the scenario shown in FIG. 7(a) to FIG. 7(c). In FIG. 7(a) to FIG. 7(c), the mobile phone 11 is a source device 31 in FIG. 6, the watch 14 is a prompt device 32 in FIG. 6, and the notebook computer 17 is a continuation device 33 in FIG. 6.

Step S610: As shown in FIG. 7(a), the mobile phone 11 may generate a notification based on a received background service notification. For example, an email application of the mobile phone 11 receives a new email in the background, and may start a notification service and run a window manager and a notification manager, to pop up a window 111 on a display 110, so as to remind a user that the new email is received. If the mobile phone 11 is in a screen-off and unused state, or the mobile phone 11 is not around the user, the user cannot know a notification of the mobile phone 11 in time, and may miss an important email. The status manager 311 of the mobile phone 11 may determine, based on a type of the notification (which is a screen-off notification in this embodiment) and a type of the notification service (which is an email in this embodiment), that the notification needs to be sent to another device for prompting, so as to enhance capabilities of interaction and cooperation between devices, thereby preventing the user from missing an important email.

Step S620: Select a proper device for prompting, and select a proper device to complete a task corresponding to the notification. For example, the prompt device manager 312 of the mobile phone 11 may select a proper device (as a notification device) from devices that are networked with the mobile phone 11, for prompting. The continuation device manager 313 of the mobile phone 11 may select a proper device (as a continuation device) from the devices that are networked with the mobile phone 11, to complete the task corresponding to the notification. Selecting the notification device and the continuation device from the devices during the networking can ensure security of data access and information transmission between devices.

In an embodiment, the system 10 includes the tablet computer 12, the watch 14, and the notebook computer 17. The prompt device manager 312 may learn, by using the networking manager, that the watch 14 is worn by the user. The watch 14 has an interaction capability and may display brief information of a notification, but the watch 14 has a relatively poor interaction capability, and is not suitable for replying to an email. In addition, the watch may remind the user in real time through sound and vibration. Therefore, the prompt device manager 312 selects the watch 14 as the prompt device to prompt the user that the mobile phone 11 receives an email. The prompt device manager 312 may further determine, based on a physical characteristic of the watch 14 (a display capability and an interaction capability of the watch 14 are relatively poor), that the watch 14 displays the brief information of the notification through text. The prompt device manager 312 determines, based on conditions of devices near the user, an optimal device for prompting a notification, and switches an important notification to a device such as the watch 14 for prompting, so as to enhance capabilities of interaction and cooperation between devices, thereby preventing the user from missing an important notification, and helping the user quickly and conveniently obtain a latest notification.

The continuation device manager 313 learns that the notebook computer 17 is closest to the watch 14 (it may be considered that the notebook computer 17 is closest to the user), and the notebook computer 17 has a better display capability and a better interaction capability, and is suitable for processing an email. Therefore, the continuation device manager 313 selects the notebook computer 17 as the continuation device to execute the task corresponding to the notification (that is, to process the email). For example, the watch 14 may determine a distance from each device in the system 10 through Bluetooth received signal strength indication (Received Signal Strength Indication, RSSI) ranging. In an embodiment, a smart camera in the system 10 may also access a local area network. The smart camera may detect a location of the user through facial recognition, infrared detection, or the like, and send the location of the user to the prompt device manager 312. The prompt device manager 312 determines, based on the location of the user and a location of each device in the system 10 (the location of each device may be obtained through satellite positioning), a device in the system 10 that is closer to the user and more suitable as the prompt device. When a device closer to the user is selected as the prompt device, the user more easily learns of a prompt of the prompt device.

Step S630: The mobile phone 11 sends a prompt message (that is, a first message) to the watch 14 based on a decision of the notification decision manager 310 (that is, the watch 14 prompts that the mobile phone 11 receives an email, and the notebook computer 17 processes the email). The prompt message is used to prompt, on the watch 14, that the mobile phone 11 receives an email, and is used to notify that the notebook computer 17 is suitable for processing the email as the continuation device. The prompt message may include information about the notification in the mobile phone 11 and information about the notebook computer 17. For example, the prompt message may include one or more of information about the continuation device (that is, information about a third device, including information used to identify the continuation device, for example, a name of the continuation device and a media access control address (Media Access Control Address, MAC address) of the continuation device), service intent (Intent, which describes an action of one operation in an application, data used in the action, and additional data, and is used to implement communication between components of the application), a service name, service data, a prompt mode, and the like, and is used for prompt on the watch 14. The mobile phone 11 may send the prompt message to the watch 14 through a wireless connection established through networking, such as a Bluetooth connection or a P2P connection.

When receiving a notification of a new email, the mobile phone 11 does not need to run an email application, and may select a notification device and a decision device by using the notification decision manager 310. The mobile phone 11 sends a prompt message to the notification device through a wireless connection between devices based on a decision result of the notification decision manager 310.

Step S640: After receiving the prompt message, the watch 14 prompts the mobile phone 11 that the notification is received. In a specific embodiment, as shown in FIG. 7(b), after the watch 14 receives the prompt message, the watch 14 runs the notification manager (which may include a system program or a service program). For example, a wireless communications module of the watch 14 detects whether the watch 14 receives the prompt message. Once the watch 14 receives the prompt message, the watch 14 runs a display program, and runs the window manager and the notification manager, to display prompt text 141 on a display 140. The prompt text 141 is used to prompt the user that the mobile phone 11 receives an email. The display 140 of the watch 14 may further display an interface element, for example, a shortcut entry 142, and corresponding text "View details on the notebook computer". When receiving a notification of a new email, the watch 14 does not need to run an email application, and may directly send a prompt message to the notebook computer 17 by interacting with the user.

In addition, the watch 14 runs a vibration program, a motor of the watch 14 is driven, and the watch 14 prompts, through vibration of the motor, the user to view the display of the watch 14. When the user wants to process the email by using the notebook computer 17, the user may perform a tap operation on the shortcut entry 142.

Step S650: In response to the tap operation (that is, input) of the user, the watch 14 sends an execution message (that is, a second message) to the notebook computer 17, to trigger the notebook computer 17 to process the email. The execution message may include information required by the notebook computer for executing the task. For example, the execution message may include one or more of service intent (Intent), a service name, and service data. In this way, after the notebook computer 17 receives the execution message, the notebook computer 17 may automatically start a corresponding service or run a corresponding application or program, thereby improving a capability of cooperation between devices, and improving information processing efficiency. In an embodiment, when the user taps the shortcut entry 142, the watch 14 may directly send, based on the information about the continuation device in the prompt message, the execution message to the notebook computer 17 through a wireless connection established through networking, such as a Bluetooth connection or a P2P connection.

Step S660: After the notebook computer 17 receives the execution message, the notebook computer 17 executes the task corresponding to the notification, and pops up an email prompt box or directly opens a corresponding email. As shown in FIG. 7(c), the corresponding email is directly displayed on a display 170, and the corresponding email does not need to be opened from an entry of the email application. In addition, the email application does not need to be in a running state (including running in the background) before the execution message is received. By interacting with the watch 14, the user may directly process the email by using the notebook computer 17, thereby saving operations, improving display efficiency, and improving user experience.

Specifically, after receiving the execution message, the notebook computer 17 opens a corresponding service based on the service name, and performs a corresponding operation based on the description of the intent and the service data. In an embodiment, the mobile phone 11 receives an email "subscription content" sent by Lucy, and the service name is used to open an email service. For example, the service name may be "email". The intent is used to notify an operating system of the notebook computer 17 to perform a "view" action, and the service data is used to notify the operating system of the notebook computer 17 that a view object corresponding to the action is the "subscription content" email. Then, a corresponding activity (Activity) is invoked to perform a corresponding operation, that is, open the "subscription content" email sent by Lucy, so that a "subscription notification" email can be directly displayed on the display 170 of the notebook computer 17.

When the notebook computer 17 receives the execution message, the notebook computer 17 is in a screen-unlocked state. In this case, the notebook computer 17 may automatically start the email service, and open the corresponding email, so that the user can directly process the email and reply to the email. When the notebook computer 17 receives the execution message, the notebook computer 17 is in a screen-locked state. In this case, after the user unlocks the notebook computer 17, the email service is automatically started, and the corresponding email is opened, so that the user can directly process the email and reply to the email. Alternatively, when the notebook computer 17 receives the execution message, the notebook computer 17 is in a screen-locked screen. In this case, before the user unlocks the notebook computer 17, the operating system of the notebook computer automatically starts the email service, and opens the corresponding email. In this case, after the user unlocks the notebook computer 17, the user can directly process the email and reply to the email.

In an embodiment, if no email application is installed in the notebook computer 17, when the notebook computer 17 receives the execution message, the notebook computer 17 may send a screen projection request to the mobile phone 11 through a wireless connection established through networking. The screen projection request is used to invite the mobile phone 11 to execute a service corresponding to the notification, and project a display interface on a screen of the mobile phone on the notebook computer 17. The screen projection request may carry an identifier of the notebook computer 17 (for example, a name of the notebook computer and/or a MAC address of the notebook computer), so that the invited device, that is, the mobile phone 11 sends display data on the display interface of the mobile phone 11 to the notebook computer 17 based on the identifier of the notebook computer 17. In a specific scenario, when the notebook computer 17 sends a screen projection request to the mobile phone 11, the mobile phone 11 wakes up a screen projection service process. The screen projection service process may further wake up an operating system of the mobile phone 11, and then the operating system of the mobile phone 11 generates corresponding display data and stores the corresponding display data in a video card of the mobile phone 11. In addition, the mobile phone 11 sends the display data to the notebook computer 17 through a wireless connection. After receiving the display data, the notebook computer 17 displays a standby interface or a current interface of the mobile phone 11 on the display 170 of the notebook computer 17. In another specific scenario, when the notebook computer 17 sends a screen projection request to the mobile phone 11, the screen projection request further includes the execution message, and the mobile phone 11 wakes up a screen projection service process. The screen projection service process may further wake up an operating system of the mobile phone 11, and then the operating system of the mobile phone 11 generates corresponding display data and stores the corresponding display data in a video card of the mobile phone 11. In addition, the mobile phone 11 runs the email application based on the execution message, invokes a corresponding activity (Activity), and opens the "subscription content" email sent by Lucy. In addition, the mobile phone 11 sends the display data to the notebook computer 17 through a wireless connection. After the notebook computer 17 receives the display data, the mobile phone 11 directly projects the "subscription notification" email on the display 170 of the notebook computer 17. Subsequently, the projection service process may still transmit the display data to the notebook computer 17 in real time.

It should be noted that, when waking up the operating system of the mobile phone 11, the projection service process may further wake up the screen of the mobile phone 11, or may execute the projection service in a black screen state. This is not limited in this embodiment of the present invention.

In an embodiment, step S650 may further include: In response to the tap operation (that is, a confirmation operation) of the user, the watch 14 sends a confirmation message (that is, a third message) to the mobile phone 11 through a wireless connection. The confirmation message is used to notify the mobile phone 11 that the user determines to view an email by using the notebook computer 17. After receiving the confirmation message, the mobile phone 11 sends an execution message (that is, a fourth message) to the notebook computer 17 through the wireless connection, to trigger the notebook computer 17 to process the email. The execution message is used to open an email application on the notebook computer 17, or is used to project the email application on the mobile phone 11 on the notebook computer 17. In a specific scenario, after the notebook computer 17 receives the execution message, the notebook computer 17 executes the task corresponding to the notification, and pops up an email prompt box or directly opens a corresponding email. In another specific scenario, when the notebook computer 17 sends a screen projection request to the mobile phone 11, the screen projection request is used to invite the mobile phone 11 to execute a service corresponding to the notification, and project a display interface on a screen of the mobile phone 11 on the notebook computer 17. In still another specific scenario, after receiving the confirmation message sent by the watch 14, the mobile phone 11 runs the email application, invokes a corresponding activity (Activity) and intent, and opens the "subscription content" email sent by Lucy. In addition, the mobile phone 11 sends the execution message to the notebook computer 17. The execution message is used to project the "subscription content" email on the mobile phone 11 on the display 170 of the notebook computer 17. After receiving the execution message, the notebook computer 17 establishes a projection connection with the mobile phone 11. The mobile phone 11 projects the "subscription content" email on the display 170 of the notebook computer 17, and the user may view the email on the notebook computer 11.

In an embodiment, the continuation device manager 313 of the watch 14 may be used to select a device in the system 10 that is used as the continuation device. Specifically, in step S620, the notification decision manager 310 of the mobile phone 11 selects the watch 14 as a notification device, and the mobile phone 11 may not select a continuation device. In step S630, the mobile phone 11 sends a prompt message to the watch 14, where the prompt message is used to prompt, on the watch 14, that the mobile phone 11 receives an email, and the prompt message may not include information about the continuation device. In step S640, the watch 14 prompts that the mobile phone 11 receives the email, and the continuation device manager 313 of the watch 14 selects the notebook computer 17 as the continuation device based on a status of each device in the system 10 that is obtained through networking, and displays a shortcut entry of the notebook computer 17. In step S650, the watch 14 sends an execution message to the notebook computer 17 in response to an operation of tapping the shortcut entry by the user. In step S650, after receiving the execution message, the notebook computer 17 executes a task corresponding to the notification.

In an embodiment, each device in the system 10 may establish a wireless connection, and learn of a status of another device through the wireless connection. In a specific embodiment, after the mobile phone 11 generates the notification, the mobile phone 11 sends a request for establishing a connection. After receiving a response message from a device such as a tablet computer, a TV, a speaker, or a notebook computer, the mobile phone 11 may first establish an untrusted connection with each device. Based on the established untrusted connection, information required for trusted authentication may be transmitted between the mobile phone 1 and each device. For example, the mobile phone 11 may learn of a status of each device in the system 10 in the following manner: Manner 1: Each device in the system 10 may report the status of the device to the mobile phone 1 through an established wireless connection. Manner 2: The mobile phone 11 may obtain the status of each device in the system 10 from a cloud server. The server may be a device that provides a smart home service for the mobile phone 11 and various household devices such as a speaker, a TV, and a tablet computer.

A specific implementation in which the mobile phone 11 determines whether there is a device that can be configured to prompt the mobile phone 11 to generate a notification or execute a task corresponding to the notification may be as follows: Before the mobile phone 11 generates the notification, the mobile phone 11 has networked with the devices in the system 10, and after the mobile phone 11 generates the notification, the mobile phone 11 selects a prompt device and a continuation device from the devices during the networking.

In some embodiments, verification on a trust relationship between the mobile phone 11 and each device may then be completed through centralized authentication or distributed authentication, so that the mobile phone 11 determines a trusted device from the devices such as the tablet computer, the TV, the speaker, and the notebook computer, or determines, from the devices such as the tablet computer, the TV, the speaker, and the notebook computer, a device that is trusted by the mobile phone 11. For example, the mobile phone 11 determines that the tablet computer, the TV, and the speaker are trusted devices, or determines that the mobile phone 11 and the tablet computer are mutually trusted devices, the mobile phone 11 and the TV are also mutually trusted devices, and the mobile phone 11 and the speaker are also mutually trusted devices. The notebook computer is not a trusted device, or the mobile phone 11 and the notebook computer are not mutually trusted devices.

In an embodiment, the speaker 15 may be the prompt device 32 in FIG. 7(*a*) to FIG. 7(*c*). When the mobile phone 11 receives a notification of a new email, if the speaker 15 is relatively close to the user, the prompt device manager 312 may select the speaker 15 as the prompt device. The mobile phone 11 may send a prompt message to a speaker server (for example, a cloud server) by using a router, and the speaker server performs voice interaction with the user by using the speaker 15. After receiving the prompt message, the speaker server may control the speaker 15 to send a voice prompt to the user to prompt that the email is received. For example, the speaker 15 may broadcast "The mobile phone receives a new email." In addition, the speaker 15 may further broadcast a speech "Please determine whether to switch to the notebook computer for processing". For example, the speaker 15 may broadcast "whether to switch to the notebook computer for processing." When the user wants to process the email by using the notebook computer 17, the user replies to the speaker 15 with a speech such as "OK" or "Yes", and the speaker 15 reports the reply of the user to the speaker server. In response to the reply of the user, the speaker server may send an execution message to the notebook computer 17 by using the router. By interacting with the speaker 15, the user may directly process the email by using the notebook computer 17.

In an embodiment, the source device 31 and the continuation device 33 may be a same device. For example, as shown in FIG. 8(*a*) to FIG. 8(*c*), both the source device 31 and the continuation device 33 are notebook computers 17. As shown in FIG. 8(*a*), when the notebook computer 17 receives a notification of a new email, the notebook computer 17 may pop up a window 171 on the display 170 of the notebook computer 17, to prompt the user that the notebook computer 17 receives the email. If the watch 14 is worn by the user, the prompt device manager 312 may select the watch 14 as the prompt device. After the watch 14 receives the prompt message, the display 140 of the watch 14 displays the prompt text 141, the shortcut entry 142, and the text corresponding to the shortcut entry 142: "View details on the notebook computer". As shown in FIG. 8(*b*), when the user wants to process the email by using the notebook computer 17, the user may perform a tap operation on the shortcut entry 142. In response to the tap operation of the user, the watch 14 sends an execution message to the notebook computer 17. As shown in FIG. 8(*c*), after the notebook computer 17 receives the execution message, the notebook computer 17 may start an email service, and open a corresponding email, so that the user can directly process the email and reply to the email. By interacting with the watch 14, the user may directly process the email by using the notebook computer 17.

In an embodiment, one or more of the notification decision manager 310, the prompt device manager 312, and the continuation device manager 313 may be located in a decision server. For example, when the mobile phone 11 generates a notification, the mobile phone 11 reports the notification to the decision server. The decision server determines whether the notification received by the mobile phone 11 needs to be sent to another device for prompting, and determines a device that needs to prompt the notification, and a device that needs to continue a task corresponding to the notification. After making a decision, the decision server sends a prompt message to a prompt device. In another embodiment, one or more of the notification decision manager 310, the prompt device manager 312, and the continuation device manager 313 may be located in different devices. For example, the notification decision manager 310 and the prompt device manager 312 in the mobile phone 11 determine whether a notification received by the mobile phone 11 needs to be sent to another device for prompting, and determine a device that needs to prompt the notification, and the continuation device manager 313 in the prompt device determines a device that needs to continue a task corresponding to the notification.

Figure 8A:
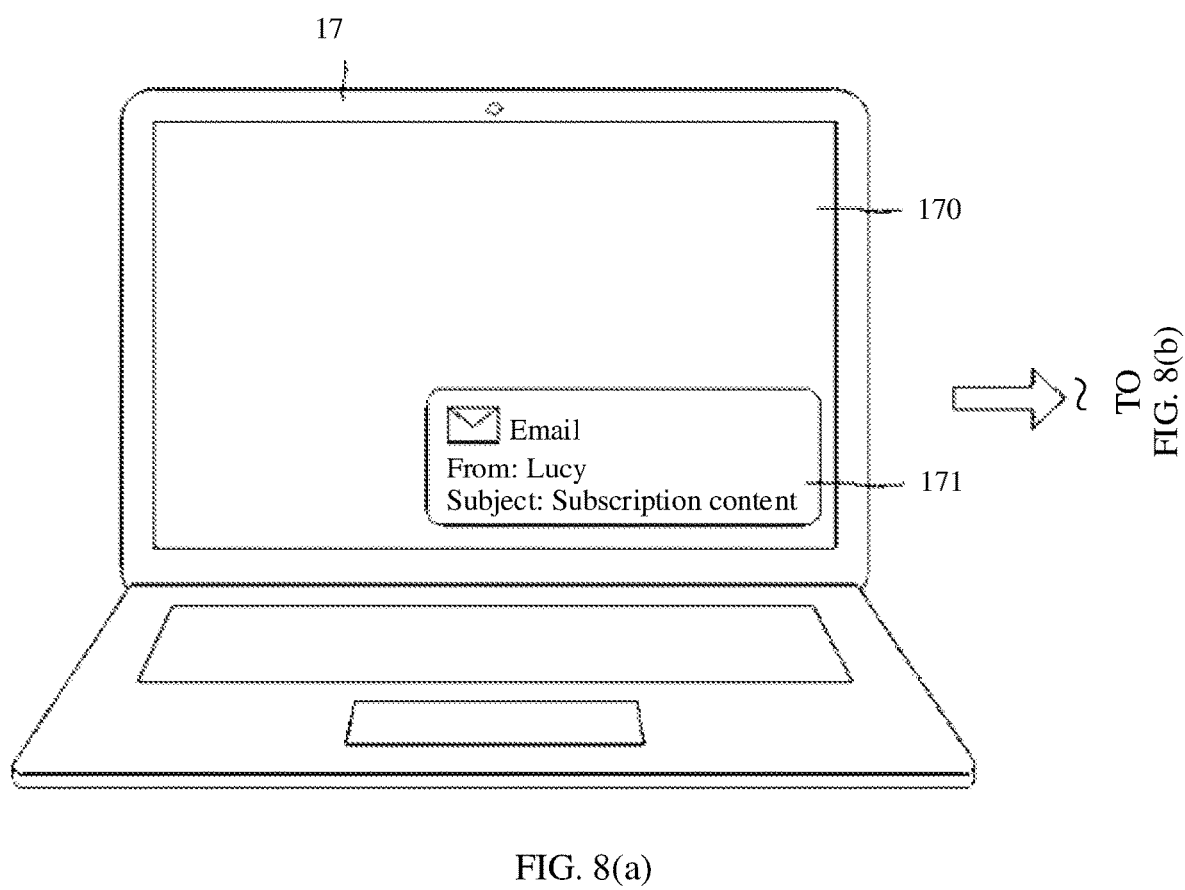
FIG. 8(a) to FIG. 8(c) are a schematic diagram of a graphical user interface of each device in a scenario according to an embodiment of this application.
Figure 8B:
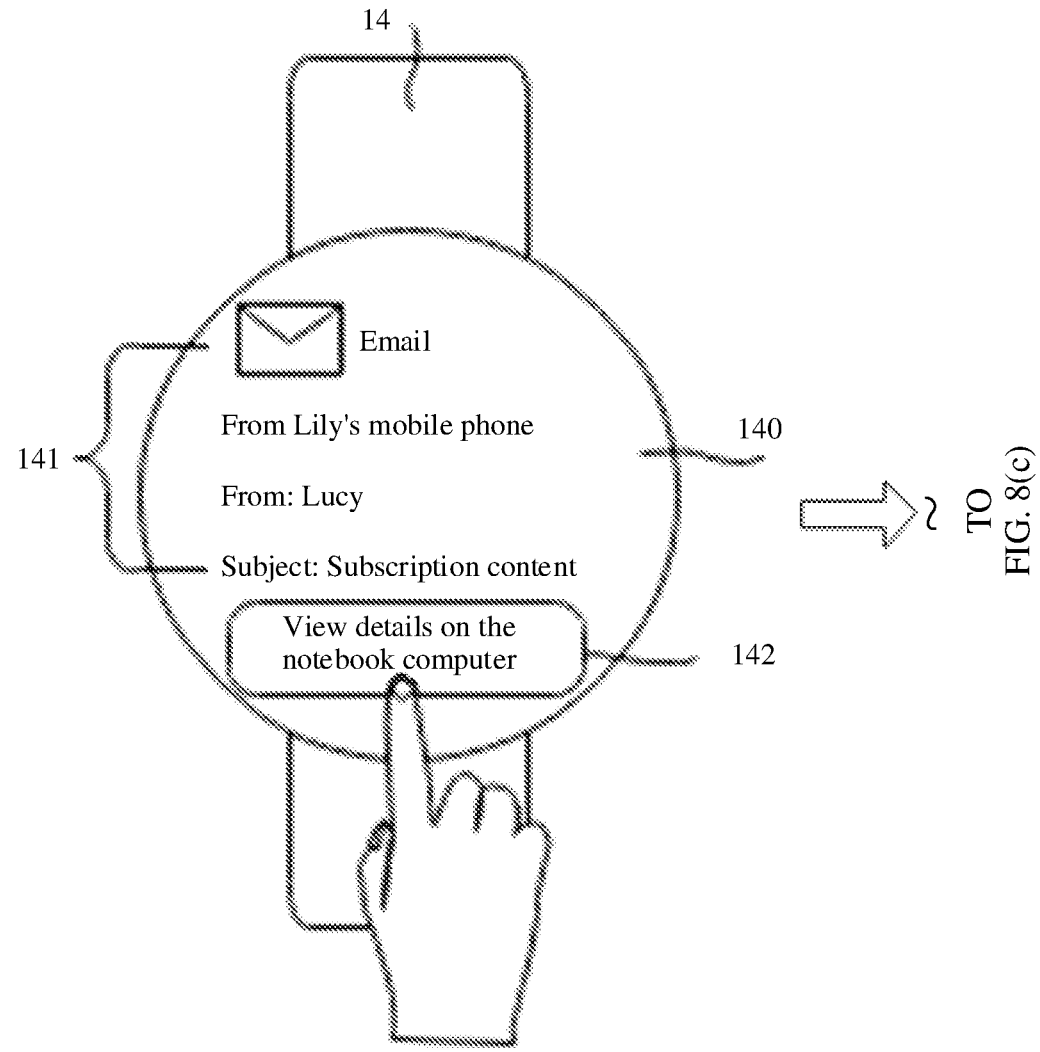
Figure 8C:
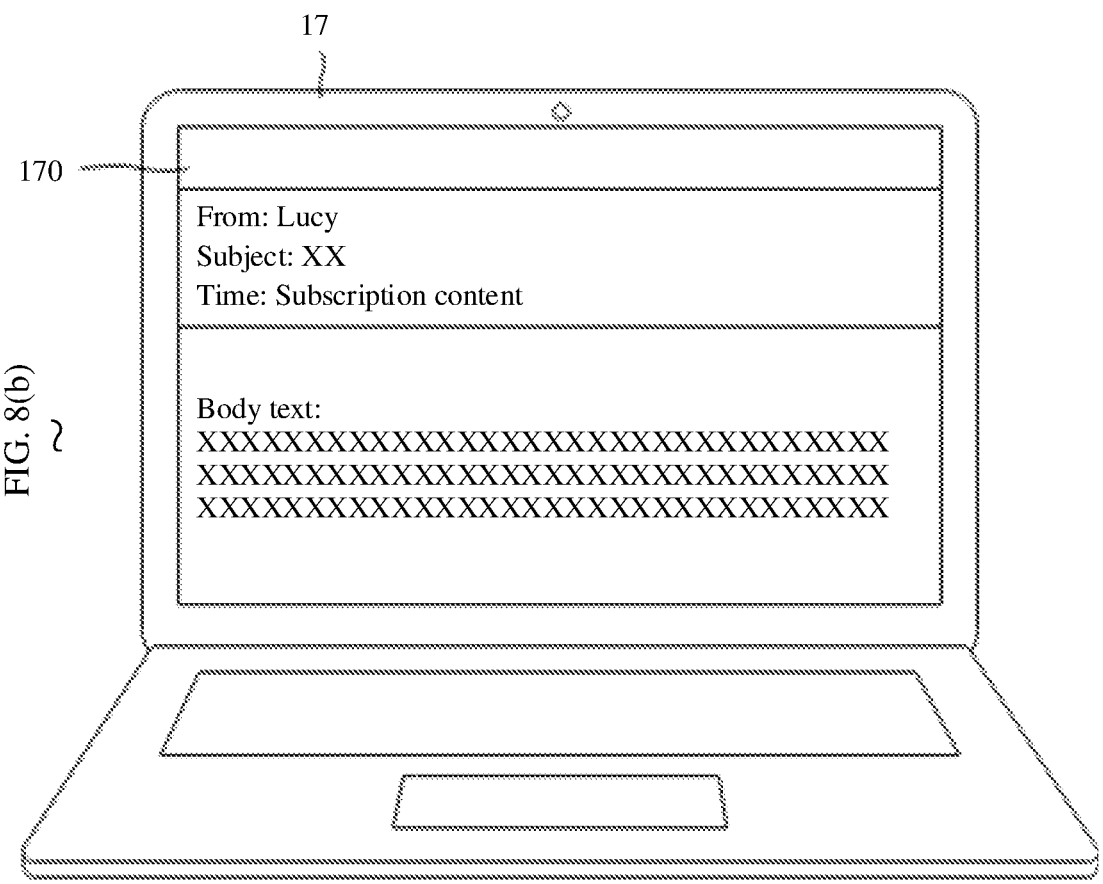
Figure 9A:
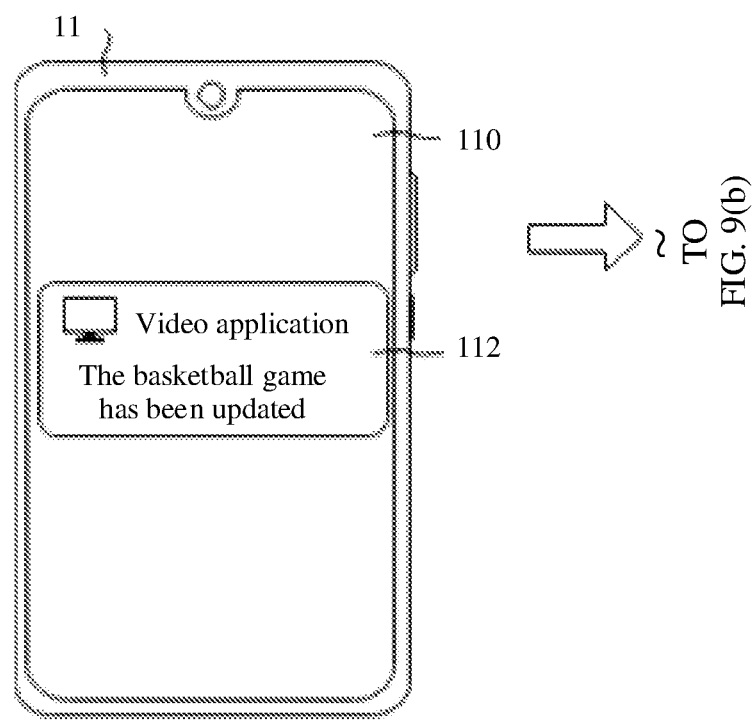
FIG. 9(a) to FIG. 9(c) are a schematic diagram of a graphical user interface of each device in a scenario according to an embodiment of this application.
Figure 9B:
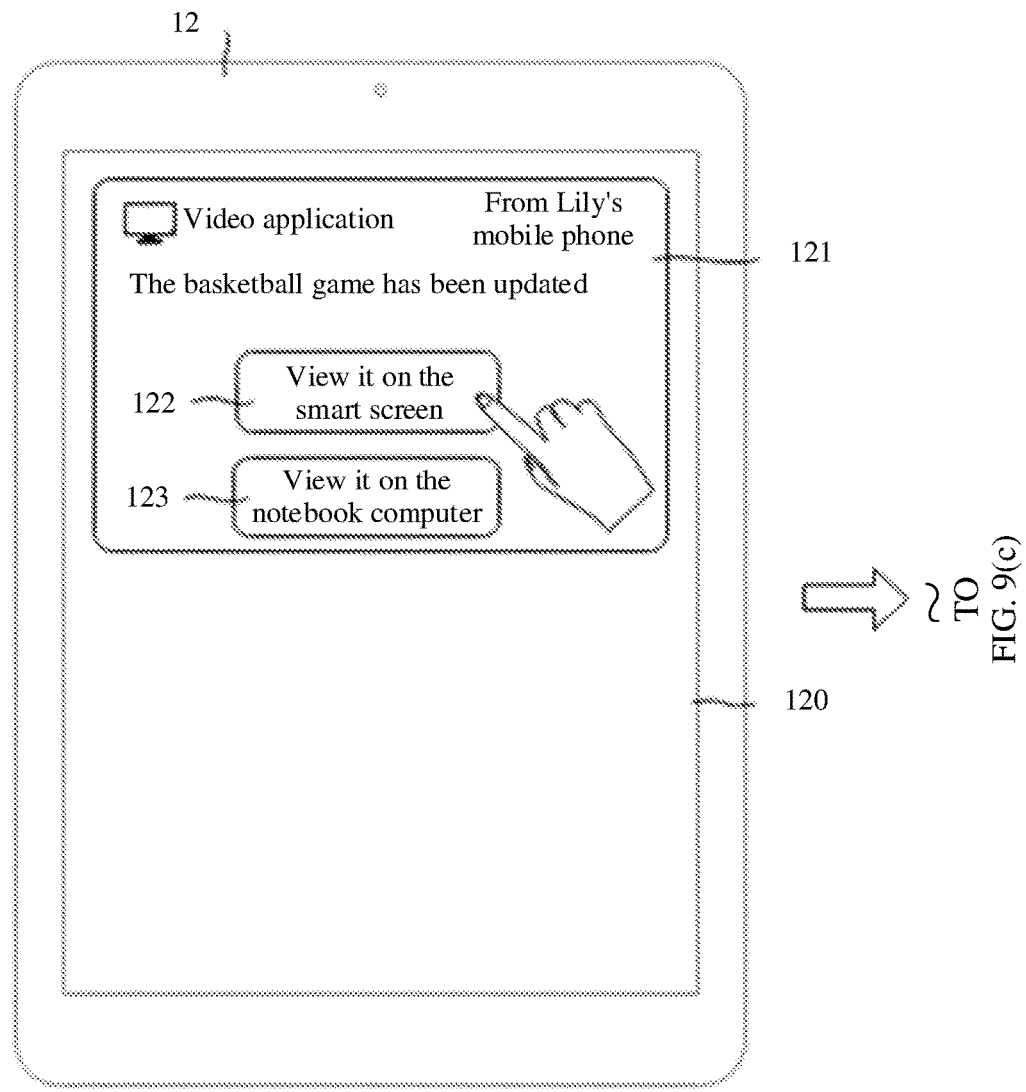
Figure 9C:
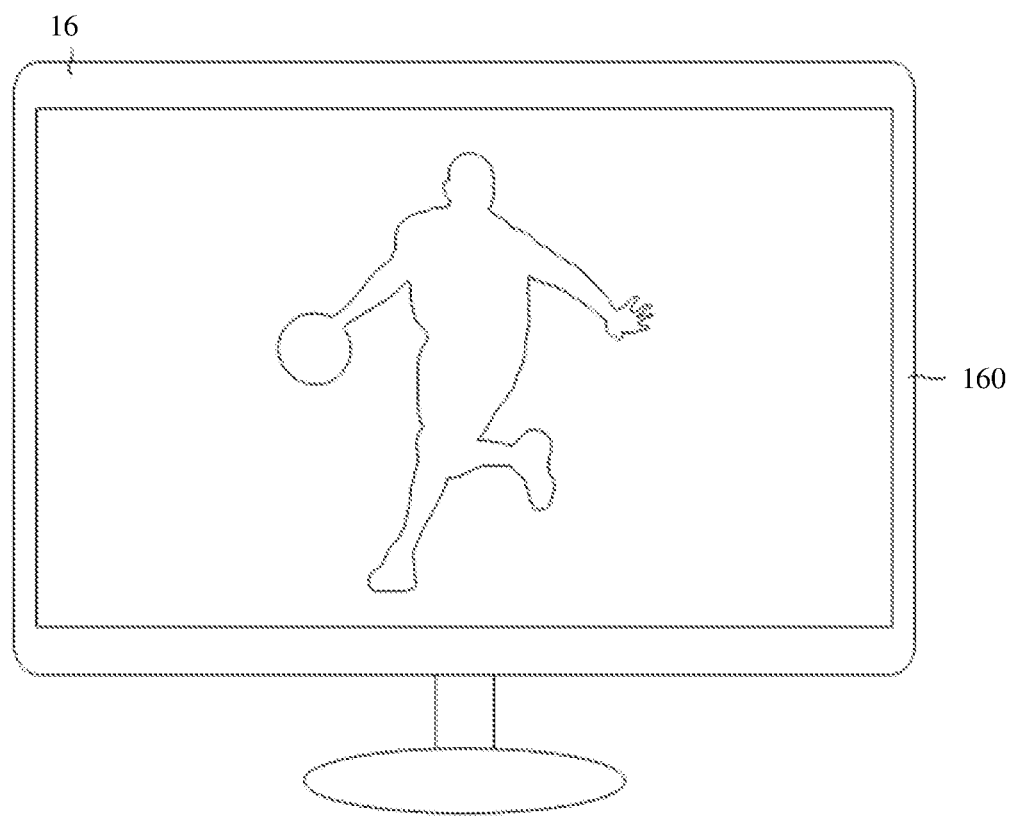

FIG. 9(a) to FIG. 9(c) are a schematic diagram of devices in an application scenario according to an embodiment. The method shown in FIG. 6 is used in the scenario shown in FIG. 9(a) to FIG. 9(c). In FIG. 8(a) to FIG. 8(c), the mobile phone 11 is a source device 31 in FIG. 5, the tablet computer 12 is a prompt device 32 in FIG. 5, and the smart screen 16 is a continuation device 33 in FIG. 5. In different application scenarios, a same process in the notification processing method is not described again.

Step S610: As shown in FIG. 9(a), a video application of the mobile phone 11 receives a video play update notification in the background, and the mobile phone 11 may pop up a window 112 on a display 110, to remind a user that a basketball game has been updated. If the user cannot know a notification of the mobile phone 11 in time, the user may miss a latest basketball game. The status manager 311 of the mobile phone 11 may determine, based on a type of the notification (which is a screen-off notification in this embodiment) and a type of a notification service (which is the video application in this embodiment), that the notification needs to be sent to another device for prompting, so as to enhance capabilities of interaction and cooperation between devices, thereby preventing the user from missing a latest basketball game.

Step S620: For example, the tablet computer 12, the smart screen 16, and the notebook computer 17 are all networked with the mobile phone 11, and the prompt device manager 312 learns that the tablet computer 12 is being used, and that the tablet computer 12 may display the notification and may remind the user in time. Therefore, the prompt device manager 312 selects the tablet computer 12 as a prompt device. The prompt device manager 312 may further determine that the tablet computer 12 displays information about the notification through text, so as to enhance capabilities of interaction and cooperation between devices, thereby preventing the user from missing a latest basketball game. In an embodiment, if a screen of the tablet computer 12 is turned on and the tablet computer 12 is being run for an application, the tablet computer 12 may send, to the mobile phone 11 through a Bluetooth connection or a P2P connection, the state in which the screen is turned on and the tablet computer 12 is being run for the application. The mobile phone 11 may determine, based on the fact that the screen of the tablet computer 12 is turned on and the tablet computer 12 is being run for the application, that the tablet computer 12 is being used.

The continuation device manager 313 of the mobile phone 11 learns that both the smart screen 16 and the notebook computer 17 are relatively close to the tablet computer 12, and that both the smart screen 16 and the notebook computer 17 have a relatively good display capability, and are suitable for playing a video. Therefore, the continuation device manager 313 may push the smart screen 16 and the notebook computer 17 to the user, and the user selects one of the smart screen 16 and the notebook computer 17 as a continuation device to execute a task corresponding to the notification (that is, to play the basketball game).

Step S630: The mobile phone 11 sends a prompt message to the tablet computer 12 based on a decision of the notification decision manager 310. The prompt message may include one or more of information about two continuation devices (information about the smart screen 16 and the notebook computer 17), service intent, a service name, service data, a prompt mode, and the like.

Step S640: After receiving the prompt message, the tablet computer 12 prompts the mobile phone 11 that the notification is received. As shown in FIG. 9(b), after the tablet computer 12 receives the prompt message, the tablet computer 12 runs a window manager and a notification manager, to pop up a window 121 on a display 120. The window 121 is used to prompt the user that the mobile phone 11 receives the notification indicating that the basketball game has been updated. The window 121 may be displayed through a status bar or banner notification. The window 121 may further display two shortcut entries. Text corresponding to a shortcut entry 122 is "View it on the smart screen", and text corresponding to a shortcut entry 123 is "View it on the notebook computer". When the user wants to watch the basketball game by using the smart screen 16, the user may perform a tap operation on the shortcut entry 122. When the user wants to watch the basketball game by using the notebook computer 17, the user may perform a tap operation on the shortcut entry 113.

Step S650: In an embodiment, the user wants to watch the basketball game by using the smart screen 16, and performs a tap operation on the shortcut entry 112. In response to the tap operation (that is, a confirmation operation) of the user, the tablet computer 12 sends an execution message to the smart screen 16, to trigger the smart screen 16 to play the basketball game. The tablet computer 12 prompts the user to select a manner of interaction with the continuation device, and in response to the confirmation operation of the user, automatically switches the task corresponding to the notification to the optimal smart screen 16 for continuous processing, thereby saving a repeated step of searching the source device (the mobile phone 11) by the user, improving task processing efficiency, and implementing more natural experience.

Step S660: As shown in FIG. 9(c), after the smart screen 16 receives the execution message, the smart screen 16 executes the task corresponding to the notification, opens the video application, invokes a corresponding activity, and plays the basketball game, so that the user directly starts a video service and plays the basketball game without opening the corresponding video application installed on the smart screen 16, thereby saving user operations and improving user experience. If no corresponding video application is installed on the smart screen 16 when the smart screen 16 receives the execution message, the smart screen 16 sends a screen projection request to the mobile phone 11. The screen projection request is used to invite the mobile phone 11 to execute a service corresponding to the notification, and project a display interface on a screen of mobile phone 11 on the smart screen 16. The screen projection request may carry an identifier of the smart screen 16, so that the invited device, that is, the mobile phone 11 sends display data on the display interface of the mobile phone 11 to the smart screen 16 based on the identifier of the smart screen 16. When the smart screen 16 sends a screen projection request to the mobile phone 11, the mobile phone 11 wakes up a screen projection service process. The screen projection service process may further wake up an operating system of the mobile phone 11, and then the operating system of the mobile phone 11 generates corresponding display data and stores the corresponding display data in a video card of the mobile phone 11. In addition, the mobile phone 11 runs the video application based on the execution message, invokes a corresponding activity (Activity), and plays the basketball game. In addition, the mobile phone 11 sends the display data to the notebook computer 17 through a wireless connection. After the notebook computer 17 receives the display data, the mobile phone 11 directly projects the basketball game on the display 170 of the notebook computer 17. Subsequently, the projection service process may still transmit the display data to the mobile phone 11 in real time. It should be noted that, when waking up the operating system of the mobile phone 11, the projection service process may further wake up the screen of the mobile phone 11, or may execute the projection service in a black screen state. This is not limited in this embodiment of the present invention.

Figure 10A:
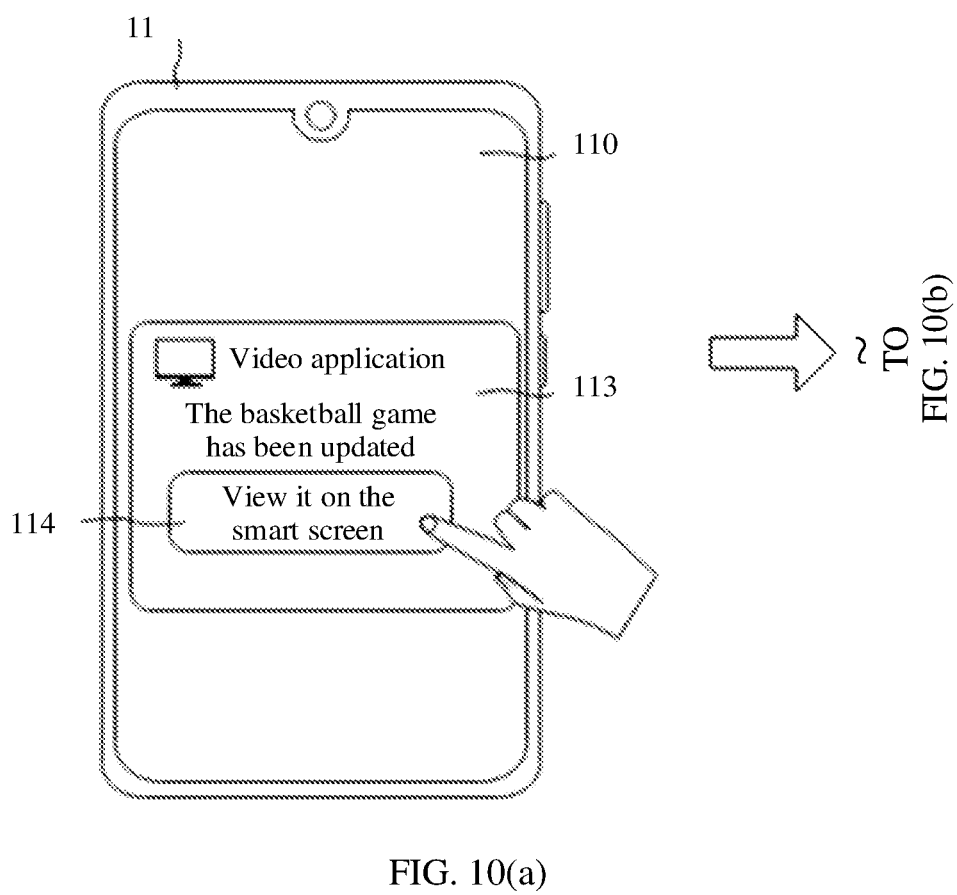
FIG. 10(a) and FIG. 10(b) are a schematic diagram of a graphical user interface of each device in a scenario according to an embodiment of this application.
Figure 10B:
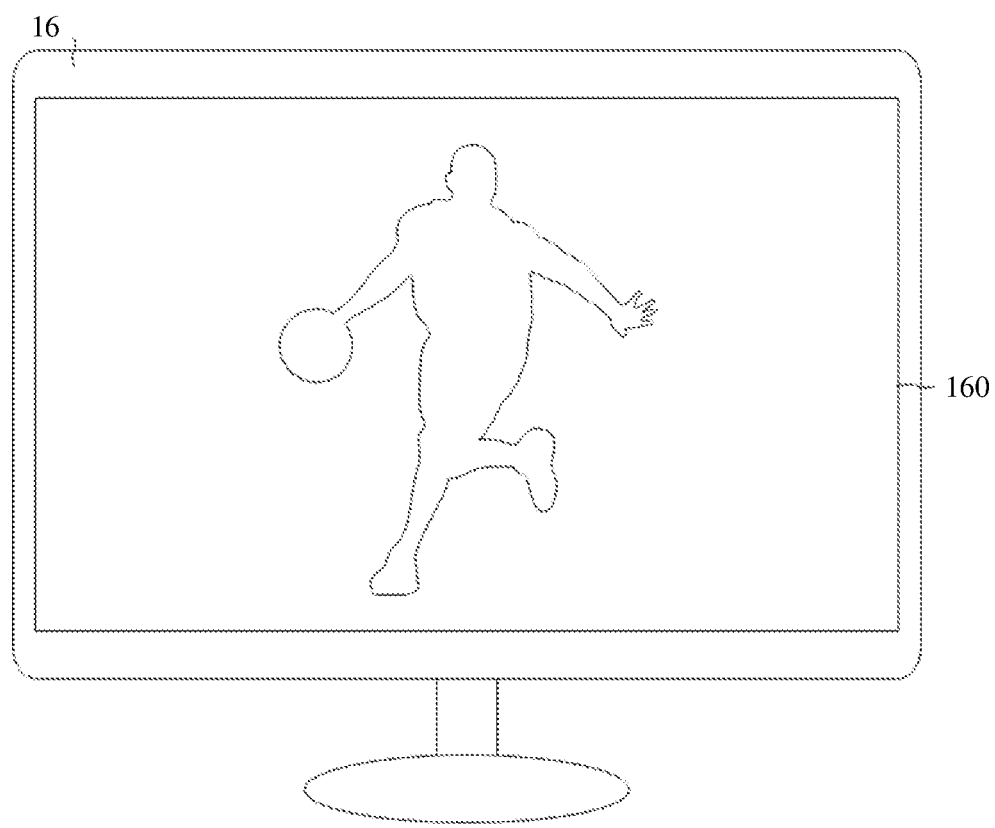

In an embodiment, the source device 31 and the prompt device 32 may be a same device. For example, as shown in FIG. 10(a) and FIG. 10(b), both the source device 31 and the prompt device 32 are mobile phones 11. When the mobile phone 11 receives a notification indicating that a basketball game is being broadcast live, if the mobile phone 11 is being used, the prompt device manager 312 may select the mobile phone 11 as the prompt device. If the smart screen 16 is near the user, the continuation device manager 313 may select the smart screen 16 as the prompt device. As shown in FIG. 10(a), the display 110 of the mobile phone 11 displays a window 113, a shortcut entry 114, and text corresponding to the shortcut entry 114: "View it on the smart screen". When the user wants to play the basketball game by using the smart screen 16, the user may perform a tap operation on the shortcut entry 114. In response to the tap operation of the user, the mobile phone 11 sends an execution message to the smart screen 16. After receiving the execution message, the smart screen 16 executes the task corresponding to the notification. As shown in FIG. 10(b), the smart screen 16 plays the basketball game. By interacting with the mobile phone 11, the user may directly play the basketball game on the smart screen 16.

Figure 11A:
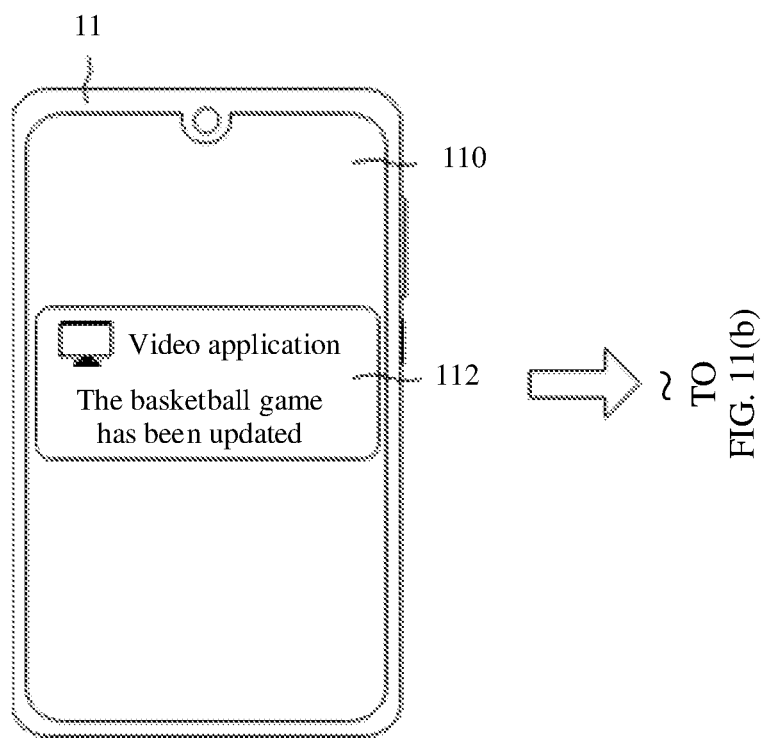
FIG. 11(a) to FIG. 11(c) are a schematic diagram of a graphical user interface of each device in a scenario according to an embodiment of this application.
Figure 11B:
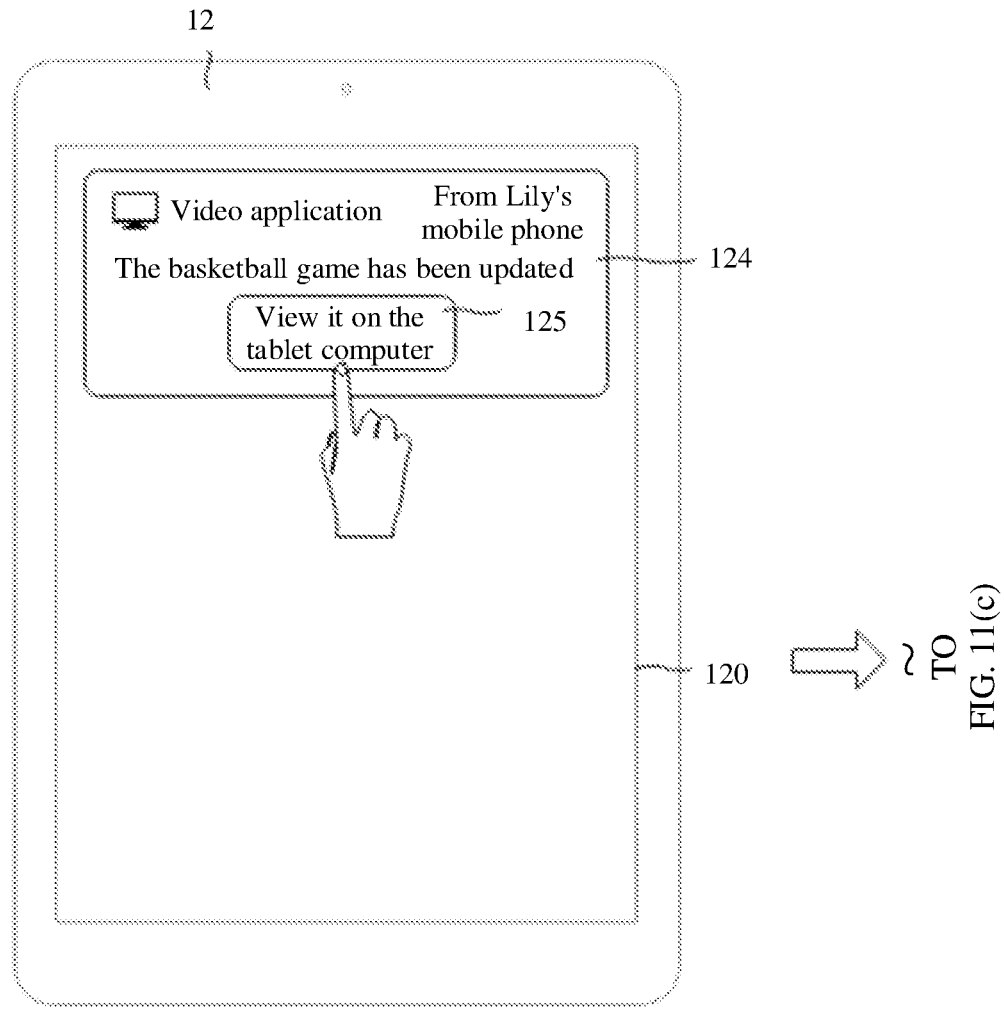
Figure 11C:
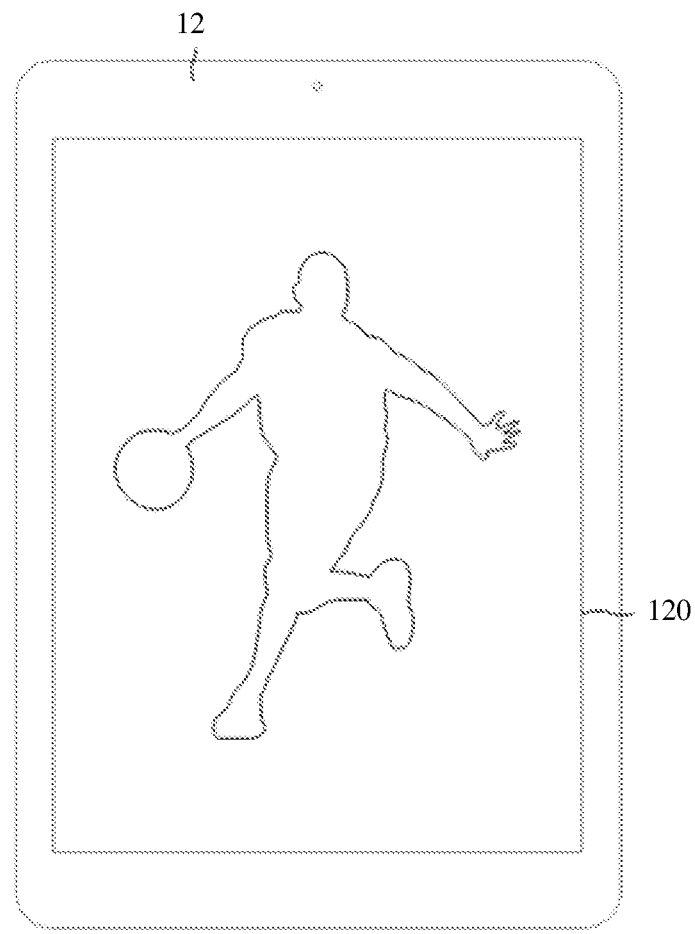

In an embodiment, as shown in FIG. 11(a) to FIG. 11(c), the prompt device 32 and the continuation device 33 may be a same device. For example, both the prompt device 32 and the continuation device 33 are tablet computers 12. When the mobile phone 11 receives a notification indicating that a basketball game is being broadcast live, as shown in FIG. 11(a), the mobile phone 11 may pop up the window 112 on the display 110, to remind the user that the basketball game has been updated. If the tablet computer 12 is being used, and no device with a larger display than the display of the tablet computer 12 is near the user, the prompt device manager 312 may select the tablet computer 12 as the prompt device. As shown in FIG. 11(b), after the tablet computer 12 receives the prompt message, the tablet computer 12 pops up a window 124 on the display 120 of the tablet computer 12. The window 124 may further display a shortcut entry 125, and text corresponding to the shortcut entry 125: "View it on the tablet computer". When the user wants to play the basketball game by using the tablet computer 12, the user may perform a tap operation on the shortcut entry 125. In response to the tap operation of the user, the tablet computer 12 starts the corresponding video service and plays the basketball game. By interacting with the tablet computer 12, the user may directly play the basketball game on the tablet computer 12.

FIG. 12(a) to FIG. 12(d) are a schematic diagram of devices in an application scenario according to an embodiment. The method shown in FIG. 6 is used in the scenario shown in FIG. 12(a) to FIG. 12(d). In FIG. 12(a) to FIG. 12(d), the mobile phone 11 is a source device 31 in FIG. 6, the watch 14 is a prompt device 32 in FIG. 6, and the smart screen 16 is a continuation device 33 in FIG. 6. In different application scenarios, a same process in the notification processing method is not described again.

Figure 12A:
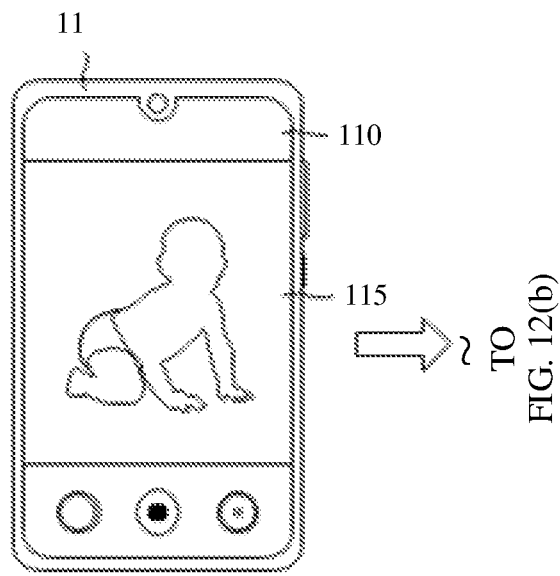
FIG. 12(a) to FIG. 12(d) are a schematic diagram of a graphical user interface of each device in a scenario according to an embodiment of this application.

Step S610: As shown in FIG. 12(a), the mobile phone 11 is performing an operation. For example, in an embodiment, the operation is a shooting operation, and the mobile phone 11 may display a shooting window 115 on the display 110. In another embodiment, the operation may alternatively be a shooting operation, a call operation, a video play operation, a music play operation, or the like.

Figure 12B:
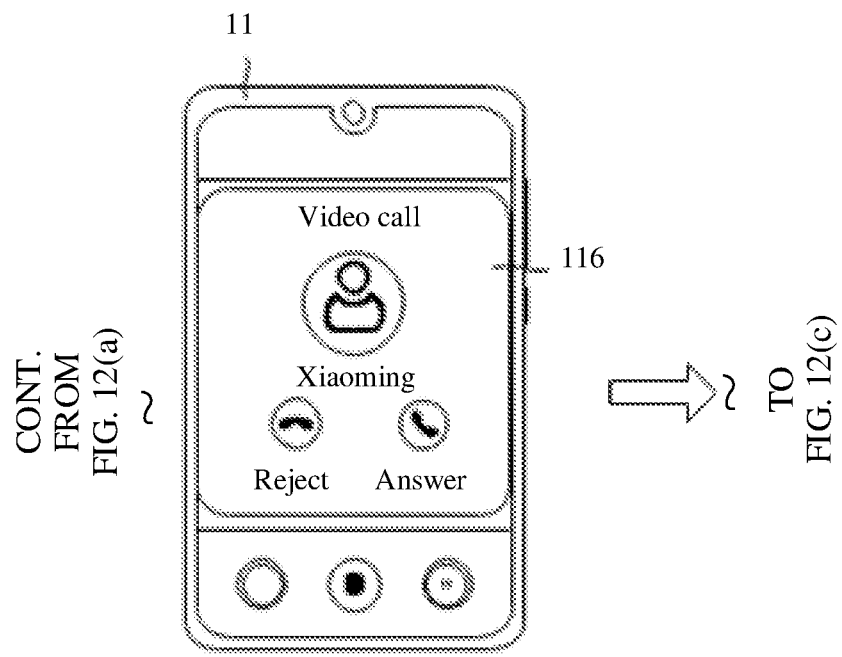

A video call application of the mobile phone 11 receives a notification of a video call request in the background, and as shown in FIG. 12(b), the mobile phone 11 may pop up a window 116 on the display 110, to remind a user that there is a new video call request. If the video call request is accepted on the mobile phone 11, the video call application invokes a camera of the mobile phone 11, and the mobile phone 11 stops shooting. The status manager 311 of the mobile phone 11 may determine, based on a type of the notification (which is a screen-on notification in this embodiment) and a type of a notification service (which is the video call application in this embodiment), that the notification needs to be sent to another device for prompting, so as to enhance capabilities of interaction and cooperation between devices, thereby preventing the mobile phone 11 from stopping shooting due to a video call.

Step S620: For example, both the watch 14 and the smart screen 16 are networked with the mobile phone 11, and the prompt device manager 312 learns that the watch 14 is worn by the user, and that the watch 14 may display the notification and may remind the user in time. Therefore, the prompt device manager 312 selects the watch 14 as a prompt device. The prompt device manager 312 may further determine that the watch 14 displays information about the notification through an icon and text, so as to enhance capabilities of interaction and cooperation between devices, thereby preventing the mobile phone 11 from stopping shooting due to a video call.

The continuation device manager 313 of the mobile phone 11 learns that the smart screen 16 is closer to the watch 14, and that the smart screen 16 has a better display capability, and is suitable for making a video call. Therefore, the continuation device manager 313 may push the smart screen 16 to the user, to execute a task corresponding to the notification (that is, to make the video call).

Step S630: The mobile phone 11 sends a prompt message to the watch 14 based on a decision of the notification decision manager 310. The prompt message may include information about a continuation device (information about the smart screen 16), service intent, a service name, service data, a prompt mode, and the like.

Figure 12C:
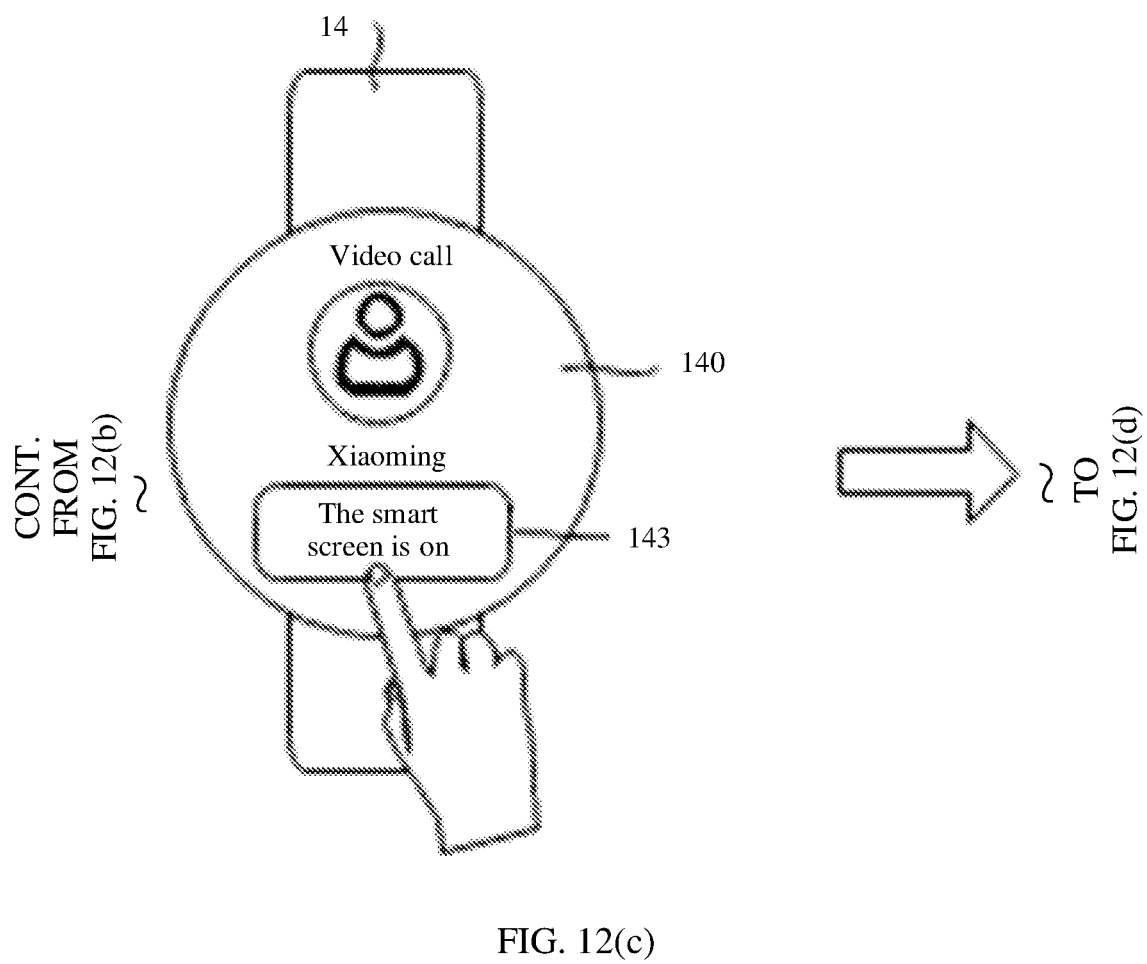
Figure 12D:
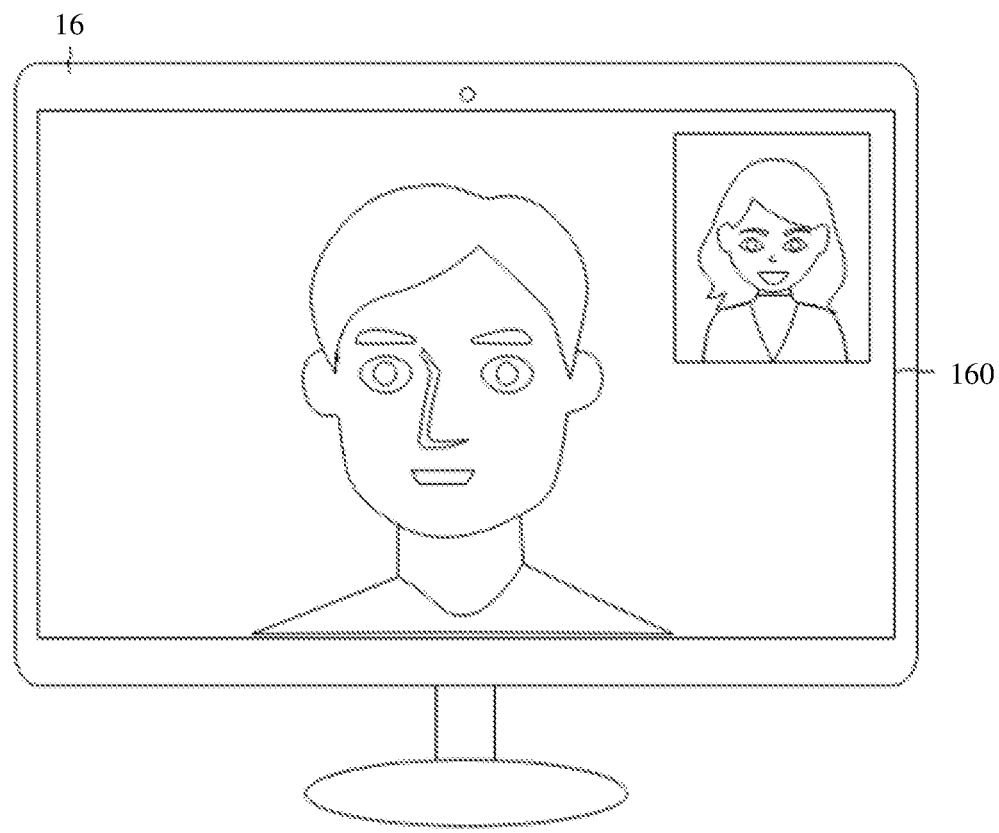

Step S640: After receiving the prompt message, the watch 14 prompts the mobile phone 11 that the notification is received. As shown in FIG. 12(c), after the watch 14 receives the prompt message, the watch 14 runs a display program, and runs a window manager and a notification manager, to prompt, on the display 140, the user that the mobile phone 11 receives the notification of the video call request. The display 140 may further display a shortcut entry 143, and text corresponding to the shortcut entry 143: "The smart screen is on". When the user wants to make the video call by using the smart screen 16, the user may perform a tap operation on the shortcut entry 143.

Step S650: In an embodiment, the user wants to make the video call by using the smart screen 16, and performs a tap operation on the shortcut entry 143. In response to the tap operation (that is, a confirmation operation) of the user, the watch 14 sends an execution message to the smart screen 16, to trigger the smart screen 16 to tap the shortcut entry 143. The watch 14 prompts the user to select a manner of interaction with the continuation device, and in response to the confirmation operation of the user, automatically switches the task corresponding to the notification to the optimal smart screen 16 for continuous processing, thereby implementing cooperation between a plurality of devices. In this way, the devices in the system 10 can process, in association, a notification received by one of the devices.

Step S660: As shown in FIG. 12(*d*), after the smart screen 16 receives the execution message, the smart screen 16 starts a corresponding video call service, invokes a corresponding activity (Activity), and invokes a camera and an audio module of the smart screen 16 to execute the task corresponding to the notification, that is, to make the video call, so that the video call service can be automatically directly started and the video call can be made without entering the video call application from a video call application entry of the smart screen 16. Through interaction with the watch 14, cooperation between a plurality of devices can be implemented, user operations can be reduced, and user experience can be improved.

An embodiment of this application discloses an electronic device, including a processor, and a memory, an input device, an output device, and a communications module that are connected to the processor. The input device and the output device may be integrated into one device. For example, a touch sensor may be used as an input device, a display may be used as an output device, and the touch sensor and the display may be integrated into a touchscreen.

Figure 13:
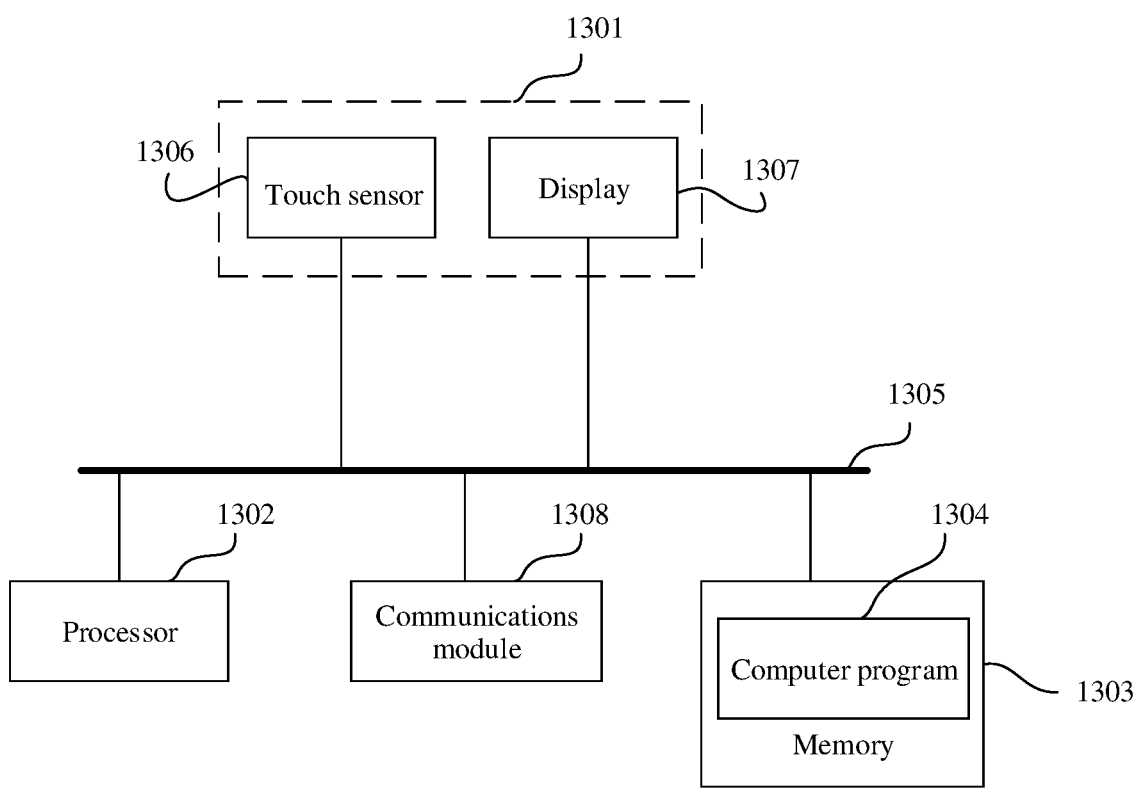
FIG. 13 is a schematic diagram of a structure of an electronic device according to an embodiment of this application.

In this case, as shown in FIG. 13, the electronic device may include: a touchscreen 1301, where the touchscreen 1301 includes a touch sensor 1306 and a display 1307; one or more processors 1302; a memory 1303; a communications module 1308; one or more application programs (not shown); and one or more computer programs 1304. The foregoing devices may be connected by using one or more communications buses 1305. The one or more computer programs 1304 are stored in the memory 1303 and are executed by the one or more processors 1302. The one or more computer programs 1304 include instructions, and the instructions may be used to perform the steps in the foregoing embodiments. All related content of the steps in the foregoing method embodiments may be cited in function descriptions of corresponding physical devices. Details are not described herein again.

For example, the processor 1302 may be specifically the processor 110 shown in FIG. 2, the memory 1303 may be specifically the internal memory 221 and/or the external memory 220 shown in FIG. 2, the display 1307 may be specifically the display 294 shown in FIG. 2, the touch sensor 1306 may be specifically the touch sensor in the sensor module 200 shown in FIG. 2, and the communications module 1308 may be specifically the mobile communications module 250 and/or the wireless communications module 260 shown in FIG. 2. This is not limited in this embodiment of this application.

The foregoing descriptions about implementations allow a person skilled in the art to understand that, for the purpose of convenient and brief description, division into the foregoing function modules is used as an example for illustration. In actual application, the foregoing functions can be allocated to different function modules and implemented according to a requirement, that is, an inner structure of an apparatus is divided into different function modules to implement all or some of the functions described above. For a detailed working process of the foregoing system, apparatus, and unit, refer to a corresponding process in the foregoing method embodiments. Details are not described herein again.

Function units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software function unit and sold or used as an independent product, the integrated unit may be stored in a computer-readable storage medium. Based on such an understanding, the technical solutions of the embodiments of this application essentially, or the part contributing to the conventional technology, or all or some of the technical solutions may be implemented in the form of a software product. The computer software product is stored in a storage medium and includes several instructions for instructing a computer device (which may be a personal computer, a server, or a network device) or a processor to perform all or some of the steps of the methods described in the embodiments of this application. The foregoing storage medium includes any medium that can store program code, such as a flash memory, a removable hard disk, a read-only memory, a random access memory, a magnetic disk, or an optical disc.

The embodiments in this specification are all described in a progressive manner, for same or similar parts in the embodiments, refer to these embodiments, and each embodiment focuses on a difference from other embodiments. Especially, an apparatus embodiment is basically similar to a method embodiment, and therefore is described briefly; for related parts, refer to the description part of the method embodiment. The above described apparatus embodiment is merely an example, in which units described as separate components may be or may not be physically separated, and components shown as units may be or may not be physical units. Some or all of the components or the modules may be selected based on an actual requirement to achieve objectives of the solutions of the embodiments. A person of ordinary skill in the art may understand and implement the embodiments of the present invention without creative efforts.

The foregoing descriptions are merely example implementations of this application, but are not intended to limit the protection scope of this application.

Embodiment 1: A notification processing system is provided. The system includes a first device and a second device.

The first device is configured to:

generate a notification, and send a first message, where the first message is used to prompt the first device to generate the notification.

The second device is configured to:

receive the first message, and generate a prompt for executing a task corresponding to the notification in a third device; and send a second message in response to receiving user's input corresponding to the prompt, to request the third device to execute the task corresponding to the notification.

Embodiment 2: According to the system in Embodiment 1, the first device is further configured to:

detect a device within a communication range that can be configured to prompt the notification; and send the first message to the second device after detecting that the second device can be configured to prompt the notification, where the first message includes notification information, and the notification information is used to prompt the first device to generate the notification.

Embodiment 3: According to the system in Embodiment 2, the first device is further configured to:

detect a device within the communication range that can be configured to execute the task corresponding to the notification; and send the first message to the second device after detecting that the third device can be configured to execute the task corresponding to the notification, where the first message further includes information about the third device, and the information about the third device is used to generate the prompt in the second device.

Embodiment 4: According to the system in Embodiment 1 or Embodiment 2, the second device is further configured to:

detect a device within the communication range that can be configured to execute the task corresponding to the notification; and after detecting that the third device can be configured to execute the task corresponding to the notification, generate the prompt for executing the task corresponding to the notification in the third device.

Embodiment 5: According to the system in any one of Embodiment 1 to Embodiment 4, the second device is further configured to display a first interface in response to the first message.

The first interface includes interface elements that are in a one-to-one correspondence with N devices, the N devices can all be configured to execute the task corresponding to the notification, the N devices include the third device, and N≥1.

The receiving user's input corresponding to the prompt specifically includes: receiving user's trigger operation on the interface element corresponding to the third device.

Embodiment 6: According to the system in Embodiment 1, the system further includes the third device, and the third device is configured to execute the task corresponding to the notification.

Embodiment 7: According to the system in Embodiment 6, the second device is further configured to send the second message to the third device, where the second message includes information about the task corresponding to the notification.

The third device is further configured to execute the task corresponding to the notification after receiving the second message.

Embodiment 8: According to the system in Embodiment 6, the second device is further configured to send a third message to the first device, where the third message is used to notify the first device to execute the task corresponding to the notification in the third device.

The first device is further configured to send a fourth message to the third device after receiving the third message, where the third message includes information about the task corresponding to the notification.

The third device is further configured to execute the task corresponding to the notification after receiving the fourth message.

Embodiment 9: According to the system in Embodiment 7 or Embodiment 8, the information about the task corresponding to the notification includes one or more of a service name, service intent, and service data that correspond to the notification.

Embodiment 10: According to the system in any one of Embodiment 6 to Embodiment 8, that the third device executes the task corresponding to the notification specifically includes: the third device runs a service corresponding to the notification.

Embodiment 11: According to the system in any one of Embodiment 6 to Embodiment 8, that the third device executes the task corresponding to the notification specifically includes: the third device sends a screen projection request to the first device.

The first device is further configured to send display data to the third device in response to the screen projection request, wherein the display data is used to display an interface of the first device on the third device.

Embodiment 12: According to the system in any one of Embodiment 1 to Embodiment 11, the first device, the second device, and the third device are logged in to by using a same account or an associated account of a same account.

Embodiment 13: According to the system in any one of Embodiment 1 to Embodiment 11, the notification includes an email notification, a video application notification, an instant messaging message notification, and a video call notification.

Embodiment 14: According to the system in any one of Embodiment 1 to Embodiment 13, the first device is a mobile phone or a tablet computer, the second device is a smartwatch or smart glasses, and the third device is a computer, a TV, or a smart screen.

Embodiment 15: An electronic device is provided. The electronic device includes a processor, a memory, a display, and a communications module. The processor, the communications module, the display, and the memory are coupled, the memory is configured to store computer program code, the computer program code includes computer instructions, and when the computer instructions are executed by the electronic device, the electronic device is enabled to perform the following operations:

receiving a first message sent by a first device, where the first message is used to prompt the first device to generate a notification;

generating a prompt for executing a task corresponding to the notification in a third device; and sending a second message in response to receiving user's input corresponding to the prompt, to request the third device to execute the task corresponding to the notification.

Embodiment 16: According to the electronic device in Embodiment 15, the first message includes information about the third device, and the electronic device generates, based on the information about the third device, the prompt for executing the task corresponding to the notification in the third device.

Embodiment 17: According to the electronic device in Embodiment 15, when the computer instructions are executed by the electronic device, the electronic device is further enabled to perform the following operations:

detecting a device within a communication range that can be configured to execute the task corresponding to the notification; and after detecting that the third device can be configured to execute the task corresponding to the notification, generating the prompt for executing the task corresponding to the notification in the third device.

Embodiment 18: According to the electronic device in any one of Embodiment 15 to Embodiment 17, when the computer instructions are executed by the electronic device, the electronic device is further enabled to further perform the following operation:

displaying a first interface in response to the first message.

The first interface includes interface elements that are in a one-to-one correspondence with N devices, the N devices can all be configured to execute the task corresponding to the notification, the N devices include the third device, and N≥1.

The receiving user's input corresponding to the prompt is specifically: receiving user's trigger operation on the interface element corresponding to the third device.

Embodiment 19: According to the electronic device in any one of Embodiment 15 to Embodiment 18, the second message includes information about the task corresponding to the notification.

Embodiment 20: According to the electronic device in Embodiment 19, the information about the task corresponding to the notification includes one or more of a service name, service intent, and service data that correspond to the notification.

Embodiment 21: According to the electronic device in any one of Embodiment 15 to Embodiment 18, the second message is used to notify the first device to execute the task corresponding to the notification in the third device.

Embodiment 22: According to the electronic device in any one of Embodiment 15 to Embodiment 21, the notification includes an email notification, a video application notification, an instant messaging message notification, and a video call notification.

Embodiment 23: According to the electronic device in any one of Embodiment 15 to Embodiment 22, the first device, the electronic device, and the third device are logged in to by using a same account or an associated account of a same account.

Embodiment 24: According to the electronic device in any one of Embodiment 15 to Embodiment 22, the first device is a mobile phone or a tablet computer, the electronic device is a smartwatch or smart glasses, and the third device is a computer, a TV, or a smart screen.

Embodiment 25: A notification prompt method is provided. The method includes:

The second device receives a first message sent by a first device, where the first message is used to prompt the first device to generate a notification.

The second device generates a prompt for executing a task corresponding to the notification in a third device.

The second device sends a second message in response to receiving user's input corresponding to the prompt, to request the third device to execute the task corresponding to the notification.

Embodiment 26: According to the notification prompt method in Embodiment 25, the method further includes:

The second device displays a first interface in response to the first message.

The first interface includes interface elements that are in a one-to-one correspondence with N devices, the N devices can all be configured to execute the task corresponding to the notification, the N devices include the third device, and N≥1.

The receiving user's input corresponding to the prompt specifically includes: receiving user's trigger operation on the interface element corresponding to the third device.

Embodiment 27: According to the notification prompt method in Embodiment 25 or Embodiment 26, the first device, the second device, and the third device are logged in to by using a same account or an associated account of a same account.

Embodiment 28: According to the notification prompt method in Embodiment 25 or Embodiment 26, the notification includes an email notification, a video application notification, an instant messaging message notification, and a video call notification.

Embodiment 29: According to the notification prompt method in any one of Embodiment 25 to Embodiment 28, the first device is a mobile phone or a tablet computer, the second device is a smartwatch or smart glasses, and the third device is a computer, a TV, or a smart screen.

Embodiment 30: An electronic device is provided. The electronic device includes a processor, a memory, a display, a communications module, and a notification decision manager. The processor, the mobile communications module, the display, and the memory are coupled, the memory is configured to store computer program code, the computer program code includes computer instructions, and when the computer instructions are executed by the electronic device, the electronic device is enabled to perform the following operations:

generating a notification;

detecting a device within a communication range that can be configured to prompt the notification, and detecting a device within the communication range that can be configured to execute a task corresponding to the notification;

detecting that the second device can be configured to prompt the notification, and that a third device can be configured to execute the task corresponding to the notification; and sending the first message to the second device, where the first message includes notification information and information about the third device, the notification information is used to prompt the first device to generate the notification, and the information about the third device is used to generate the prompt in the second device.

Embodiment 31: According to the electronic device in Embodiment 30, when the computer instructions are executed by the electronic device, the electronic device is further enabled to perform the following operations:

receiving a screen projection request sent by the third device; and in response to the screen projection request, starting a service corresponding to the notification, and sending display data to the third device, where the display data is used to display an interface of the first device on the third device.

Embodiment 32: According to the electronic device in any one of Embodiment 15 to Embodiment 22, the electronic device, the second device, and the third device are logged in to by using a same account or an associated account of a same account.

Embodiment 33: According to the electronic device in any one of Embodiment 15 to Embodiment 22, the electronic device is a mobile phone or a tablet computer, the second device is a smartwatch or smart glasses, and the third device is a computer, a TV, or a smart screen.

Embodiment 34: A notification processing method is provided. The method includes:

A first device generates a notification.

The first device detects a device within a communication range that can be configured to prompt the notification, detects a device within the communication range that can be configured to execute a task corresponding to the notification, and detects that the second device can be configured to prompt the notification, and that a third device can be configured to execute the task corresponding to the notification.

The first device sends the first message to the second device, where the first message includes notification information and information about the third device, the notification information is used to prompt the first device to generate the notification, and the information about the third device is used to generate the prompt in the second device.

Embodiment 35: According to the method in Embodiment 34, the method further includes:

The first device receives a screen projection request sent by the third device.

In response to the screen projection request, the first device starts a service corresponding to the notification, and sends display data to the third device, where the display data is used to display an interface of the first device on the third device.

Embodiment 36: According to the notification prompt method in Embodiment 34 or Embodiment 35, the first device, the second device, and the third device are logged in to by using a same account or an associated account of a same account.

Embodiment 37: According to the notification prompt method in Embodiment 34 or Embodiment 35, the notification includes an email notification, a video application notification, an instant messaging message notification, and a video call notification.

Embodiment 38: According to the notification prompt method in any one of Embodiment 34 to Embodiment 37, the first device is a mobile phone or a tablet computer, the second device is a smartwatch or smart glasses, and the third device is a computer, a TV, or a smart screen.

Embodiment 39: A computer-readable storage medium is provided. The computer-readable storage medium includes program instructions, and when the program instructions are run on a terminal device, the terminal device is enabled to perform the method in any one of Embodiment 25 to Embodiment 29.

Embodiment 40: A computer-readable storage medium is provided. The computer-readable storage medium includes program instructions, and when the program instructions are run on a terminal device, the terminal device is enabled to perform the method in Embodiment 34 or Embodiment 38.

What is claimed is:

1. A system, comprising:
a first device; and
a second device, wherein the first device and the second device are user terminal devices;
wherein the first device is configured to perform:
generating a notification;
determining that the notification needs to be sent to another device for prompting, the determining being based on a notification type of the notification and based on a service type of a service corresponding to the notification, wherein the notification type indicates that the notification is a screen-off notification for the determining that the notification needs to be sent to another device for prompting; and
sending a first message, wherein the first message indicates the first device generates the notification; and wherein the second device is configured to:
receiving the first message, and generate a prompt on the second device for executing a task corresponding to the notification in a third device; and
sending, from the second device to the third device, a second message without executing the task corresponding to the notification on the second device for viewing details of the notification or processing the notification generated by the first device and in response to receiving a user's input corresponding to the prompt, the second message requesting the third device to start execution of the task corresponding to the notification to show the details of the notification or process the notification,
wherein the second message further indicates a media access control (MAC) address of the third device, wherein the first device selects the second device for prompting based on the second device being suitable for displaying brief information about the notification but not suitable for displaying the details of the notification or processing the notification, and wherein the first device selects the third device for the execution of the task corresponding to the notification based on the third device having a better display capability and a better interaction capability than the second device.

2. The system according to claim 1, wherein the first device is further configured to perform:
detecting the second device within a communication range that is able to be caused to generate the prompt for executing the task corresponding to the notification; and
sending the first message to the second device after detecting that the second device is able to be caused to generate the prompt for executing the task corresponding to the notification, wherein the first message comprises notification information, and the notification information indicates the first device generates the notification.

3. The system according to claim 2, wherein the first device is further configured to perform:
detecting the third device within the communication range that is able to be caused to execute the task corresponding to the notification; and
sending the first message to the second device after detecting that the third device is able to be caused to execute the task corresponding to the notification, wherein the first message further comprises information about the third device, and the information about the third device is used to generate the prompt in the second device.

4. The system according to claim 1, wherein the second device is further configured to:
detecting a device within a communication range that is able to be caused to execute the task corresponding to the notification; and
after the detecting that the third device is able to be caused to execute the task corresponding to the notification, generating the prompt for executing the task corresponding to the notification in the third device.

5. The system according to claim 1, wherein the second device is further configured to display a first interface in response to the first message, wherein the first interface comprises interface elements that are in a one-to-one correspondence with N devices, the N devices are all able to be caused to execute the task corresponding to the notification, the N devices comprise the third device, and N≥1; and wherein the receiving the user's input corresponding to the prompt comprises:
receiving a trigger operation of the user on an interface element corresponding to the third device.

6. The system according to claim 1, wherein the system further comprises the third device, and the third device is configured to execute the task corresponding to the notification.

7. The system according to claim 6, wherein:
the second device is further configured to send the second message to the third device, wherein the second message comprises information about the task corresponding to the notification; and
the third device is further configured to execute the task corresponding to the notification after receiving the second message.

8. The system according to claim 7, wherein the information about the task corresponding to the notification comprises one or more of a service name, service intent, or service data that correspond to the notification.

9. The system according to claim 6, wherein:
the second device is further configured to send a third message to the first device, wherein the third message notifies the first device to execute the task corresponding to the notification in the third device;
the first device is further configured to send a fourth message to the third device after receiving the third message, wherein the third message comprises information about the task corresponding to the notification; and
the third device is further configured to execute the task corresponding to the notification after receiving the fourth message.

10. The system according to claim 6, wherein the third device executing the task corresponding to the notification comprises:
the third device running a service corresponding to the notification.

11. The system according to claim 6, wherein:
the third device executing the task corresponding to the notification comprises the third device sending a screen projection request to the first device; and
the first device is further configured to send display data to the third device in response to the screen projection request, wherein the display data is used to display an interface of the first device on the third device.

12. The system according to claim 1, wherein the first device, the second device, and the third device are logged in to by using a same account or an associated account of the same account.

13. The system according to claim 1, wherein the notification comprises an email notification, a video application notification, an instant messaging message notification, or a video call notification.

14. The system according to claim 1, wherein the first device is a mobile phone or a tablet computer, and the second device is a smartwatch or smart glasses.

15. An electronic device, comprising:
a processor;
a memory;
a display; and
a communications interface, wherein the processor, the communications interface, the display, and the memory are coupled, the memory is configured to store computer program code, the computer program code comprises computer instructions, and when the computer instructions are executed by the electronic device, the electronic device is enabled to perform operations including:
receiving a first message sent by a first device, wherein the first message indicates that the first device generates a notification, and wherein the first device and the electronic device are user terminal devices;
generating a prompt for executing a task corresponding to the notification in a third device; and
sending, from the electronic device to the third device, a second message without executing the task corresponding to the notification on the electronic device for viewing details of the notification or processing the notification generated by the first device and in response to receiving a user's input corresponding to the prompt, the second message requesting the third device to start execution of the task corresponding to the notification to show the details of the notification or process the notification,
wherein the second message further indicates a media access control (MAC) address of the third device, wherein the first device performs determining that the notification needs to be sent to another device for prompting, the determining being based on a notification type of the notification and based on a service type of a service corresponding to the notification, wherein the notification type indicates that the notification is a screen-off notification for the determining the notification needs to be sent to another device for prompting, wherein the first device selects the electronic device for prompting based on the electronic device being suitable for displaying brief information about the notification but not suitable for displaying the details of the notification or processing the notification, and wherein the first device selects the third device for the execution of the task corresponding to the notification based on the third device having a better display capability and a better interaction capability than the electronic device.

16. The electronic device according to claim 15, wherein the first message further comprises information about the third device, and the electronic device generates, based on the information about the third device, the prompt for executing the task corresponding to the notification in the third device.

17. The electronic device according to claim 15, the operations further comprising:
detecting a device within a communication range that is able to be caused to execute the task corresponding to the notification; and
after detecting that the third device is able to be caused to execute the task corresponding to the notification, generating the prompt for executing the task corresponding to the notification in the third device.

18. The electronic device according to claim 15, the operations further comprising:
displaying a first interface in response to the first message, wherein the first interface comprises interface elements that are in a one-to-one correspondence with N devices, the N devices are all able to be caused to execute the task corresponding to the notification, and the N devices comprise the third device, and N≥1; and
wherein receiving the user's input corresponding to the prompt comprises: receiving a trigger operation of the user on an interface element corresponding to the third device.

19. An electronic device, comprising:
a processor;
a memory;
a display;
a communications interface; and
a notification decision manager, wherein the processor, the communications interface, the display, and the memory are coupled, the memory is configured to store computer program code, the computer program code comprises computer instructions, and when the computer instructions are executed by the electronic device, the electronic device is enabled to perform operations including:
generating a notification;
determining that the notification needs to be sent to another device for prompting, the determining being based on a notification type of the notification and based on a service type of a service corresponding to the notification, wherein the notification type indicates that the notification is a screen-off notification for the determining the notification needs to be sent to another device for prompting;
detecting that a second device is able to be caused to prompt the notification and is able to send a second message without executing a task corresponding to the notification on the electronic device for viewing details of the notification or processing the notification generated by the electronic device, and that a third device is able to be caused to execute the task corresponding to the notification to show the details of the notification or process the notification, the second message sent to the third device requesting the third device to start execution of the task corresponding to the notification, wherein the electronic device and the second device are user terminal devices; and
sending a first message to the second device, wherein the first message comprises notification information and information about the third device, the notification information indicates the electronic device generates the notification, and the information about the third device is used to generate a prompt in the second device,
wherein the second message further indicates a media access control (MAC) address of the third device, wherein the electronic device selects the second device for prompting based on the second device being suitable for displaying brief information about the notification but not suitable for displaying the details of the notification or processing the notification, and wherein the electronic device selects the third device for the execution of the task corresponding to the notification based on the third device having a better display capability and a better interaction capability than the second device.

20. The electronic device according to claim 19, the operations further comprising:
receiving a screen projection request sent by the third device; and
in response to the screen projection request, starting a service corresponding to the notification, and sending display data to the third device, wherein the display data is used to display an interface of the electronic device on the third device.

21. The system of claim 1, wherein the first device determines that the notification needs to be sent to another device for prompting based on that the first device is not used when the notification is generated, and wherein the first device selects the second device for prompting based on a privacy attribute of the second device.

* * * * *